US012671748B2

(12) United States Patent
Leung et al.

(10) Patent No.: US 12,671,748 B2
(45) Date of Patent: Jun. 30, 2026

(54) CONTEXTUALIZING DATA TO PROVIDE COMPUTING ACTIVITY SYNTHESIS

(71) Applicant: Dropbox, Inc., San Francisco, CA (US)

(72) Inventors: Bonita Leung, Brooklyn, NY (US); Devin Mancuso, San Francisco, CA (US); Walter Somerville, Brooklyn, NY (US)

(73) Assignee: Dropbox, Inc., San Francisco, CA (US)

( * ) Notice: Subject to any disclaimer, the term of this patent is extended or adjusted under 35 U.S.C. 154(b) by 15 days.

(21) Appl. No.: 18/766,118

(22) Filed: Jul. 8, 2024

(65) Prior Publication Data

US 2026/0012515 A1    Jan. 8, 2026

(51) Int. Cl.
| | |
|---|---|
| *H04L 67/50* | (2022.01) |
| *G06F 16/334* | (2025.01) |
| *G06F 16/34* | (2025.01) |
| *H04L 67/306* | (2022.01) |

(52) U.S. Cl.
CPC ........ *H04L 67/535* (2022.05); *G06F 16/3347* (2019.01); *G06F 16/345* (2019.01); *H04L 67/306* (2013.01)

(58) Field of Classification Search
CPC . H04L 67/535; H04L 67/306; G06F 16/3347; G06F 16/345
USPC ........................................................ 709/224
See application file for complete search history.

(56) References Cited

U.S. PATENT DOCUMENTS

| | | | |
|---|---|---|---|
| 8,495,105 B2 | 7/2013 | Campbell et al. | |
| 9,712,629 B2 | 7/2017 | Molettiere et al. | |
| 10,467,230 B2 | 11/2019 | Alphin, III et al. | |

| | | | |
|---|---|---|---|
| 11,483,410 B1 | 10/2022 | Fleck et al. | |
| 11,687,864 B2 | 6/2023 | Tang et al. | |
| 11,733,840 B2 | 8/2023 | Faulkner et al. | |
| 12,271,360 B1 * | 4/2025 | Nguyen ................ G10L 15/183 |
| 2019/0108271 A1 * | 4/2019 | Vikramaratne ...... G06Q 10/103 |

(Continued)

FOREIGN PATENT DOCUMENTS

WO        2018233490 A1    12/2018

OTHER PUBLICATIONS

Zheng et al., "Large Language Models for Scientific Synthesis, Inference and Explanation", 2023, Arxiv, p. 1-27 (Year: 2023).*

(Continued)

*Primary Examiner* — Taylor A Elfervig

(74) *Attorney, Agent, or Firm* — Keller Preece PLLC

(57)        ABSTRACT

This disclosure describes systems that aggregate activity data items for one or more data sources for a user account. The disclosed systems can utilize a large language model to transform the activity data items to synthesized activity items. For example, the disclosed systems can utilize the large language model to transform the activity data items to the synthesized activity items by extracting the contextual content from the activity data items. The disclosed systems can utilize the large language model to process the synthesized activity items to generate an activity meta summary for a specified timeframe. Based on the activity meta summary, the disclosed systems can further identify a subset of synthesized activity items for the specified timeframe. Thereafter, the disclosed systems can provide the subset of synthesized activity items for the specified timeframe for display on a client device associated with the user account.

20 Claims, 9 Drawing Sheets

(56)         References Cited

U.S. PATENT DOCUMENTS

| | | | |
|---|---|---|---|
| 2020/0374146 A1 | 11/2020 | Chhabra et al. | |
| 2023/0050034 A1 | 2/2023 | Ben-Elazar et al. | |
| 2023/0153639 A1 | 5/2023 | Cuan et al. | |
| 2023/0376515 A1* | 11/2023 | Tanikella ............. | G06Q 10/101 |

OTHER PUBLICATIONS

H. Assal, J. Seng, F. Kurfess, E. Schwarz and K. Pohl, "Semantically-enhanced information extraction," 2011 Aerospace Conference, Big Sky, MT, USA, 2011, pp. 1-14, (Year: 2011).*

Jorke M., et al., "Supporting Physical Activity Behavior Change with LLM-Based Conversational Agents," arXiv:2405.06061v1 [cs. HC], May 9, 2024, pp. 1-53, Retrieved from the Internet: URL: https://arxiv.org/abs/2405.06061.

Tiffany L., "AI Time Tracking: Next-Level Time Management (+ Top 6 Tools)," usemotion.com [Online], Apr. 23, 2024 [Retrieved on May 28, 2024], 12 pages, Retrieved from the Internet: URL: https://www.usemotion.com/blog/ai-time-tracking.

\* cited by examiner

600

Aggregating Activity Data Items _602_

Transforming Activity Data Items To Synthesized Activity Items _604_

Generating Activity Meta Summary From Synthesized Activity Data Items _606_

Identifying Subset Of Synthesized Activity Items Based On Activity Meta Summary _608_

Providing Subset Of Synthesized Activity Items For Display _610_

700

CONTEXTUALIZING DATA TO PROVIDE COMPUTING ACTIVITY SYNTHESIS

BACKGROUND

Advancements in computing devices and networking technology have given rise to a variety of innovations in cloud-based digital content storage and access. For example, online computing systems can provide access to, and synchronize changes for, digital content items across devices. Traditional systems can also provide a suite of computer applications to accomplish a variety of tasks in a workday, such as organizing a digital calendar, managing tasks, initiating and attending video calls, sending and receiving digital communications (e.g., text messages, emails, and instant messages), and editing documents in digital content management environments. Indeed, traditional online digital content systems can provide access to digital content for user accounts across diverse physical locations and over a variety of computing devices. In addition, traditional online digital content systems can monitor contributions associated with the user account across multiple digital content items. Traditional systems can monitor individual content items and record activities or contributions relating to the individual content item. Despite these capabilities, traditional systems lack the technical capability of contextualizing activities of a user account across multiple digital content items and across multiple computing environments. Existing systems suffer from a variety of technical deficiencies relating to contextualizing data associated with the user account, especially regarding efficiency and utility.

As just suggested, many traditional systems lack the efficiency in contextualizing interactions of a user account across multiple digital content items. While traditional systems can track changes and/or activity within an individual digital content item associated with the user account, traditional systems lack the ability to efficiently synthesize changes and/or activities across multiple digital content items. Accordingly, obtaining an activity synopsis of changes and/or activities across multiple digital content items associated with the user account is a laborious, time-consuming process that requires navigating across multiple digital content items, often across multiple applications and multiple graphical user interfaces, to determine changes and/or activities associated with the digital content item. Moreover, while some traditional systems attempt to provide a history of user activity, traditional histories are typically a long list of computing activities that causes a user to take many steps to scroll through long lists of minor actions that can require a voluminous amount of user navigation steps with respect to a graphical user interface in an attempt to understand the user activity, and even then the graphical user interface list may not provide a full context of computing activity.

Not only is such frequent context switching navigationally inefficient with respect to digital content items within a content management system, the problem and disadvantage becomes more significant when considering that computing activity often moves across many applications, websites, and various graphical user interfaces. Indeed, traditional systems lack the technical ability to provide an activity synopsis from various different applications, webservices, and computing environments within which day-to-day computing activity often occurs. To attempt to understand this diverse set of computing activity within traditional systems, a user would be required to perform an excessive number of navigational steps through a large variety of graphical user interfaces, making such an attempt technically nearly impossible. Accordingly, modern computing systems have generated a significant problem in attempting to understanding the day-to-day computing activity based on the diversity of environments, applications, and locations within which computing activity now occurs.

Traditional systems are computationally inefficient as well. As suggested above, while many systems generate activity data, the large amounts of cached historical activity data frequently offer minimal benefits to user accounts associated with the traditional systems. Accordingly, traditional systems suffer from excessive data generation and storage without deriving benefits or utility from the data.

Thus, there are several disadvantages regarding existing digital content systems.

SUMMARY

This disclosure describes one or more embodiments of systems, methods, and non-transitory computer readable storage media that provide benefits and/or solve one or more of the foregoing and other problems in the art. For instance, the disclosed systems aggregate activity data items for one or more data sources for a user account (e.g. contextual content indicating a user interaction within one or more computing environments). For example, the disclosed systems can aggregate the activity data items from various document files, internet browsing websites, or messaging applications, among others. The disclosed systems can utilize a large language model to transform the activity data items to synthesized activity items. For example, the disclosed systems can utilize the large language model to transform the activity data items to the synthesized activity items by extracting the contextual content from the activity data items. The disclosed systems can utilize the large language model to process the synthesized activity items to generate an activity meta summary for a specified timeframe. Based on the activity meta summary, the disclosed systems can further identify a subset of synthesized activity items for the specified timeframe. Thereafter, the disclosed systems can provide the subset of synthesized activity items for the specified timeframe for display on a client device associated with the user account.

BRIEF DESCRIPTION OF THE DRAWINGS

This disclosure will describe one or more example implementations of the systems and methods with additional specificity and detail by referencing the accompanying figures. The following paragraphs briefly describe those figures.

DETAILED DESCRIPTION

Figure 1:
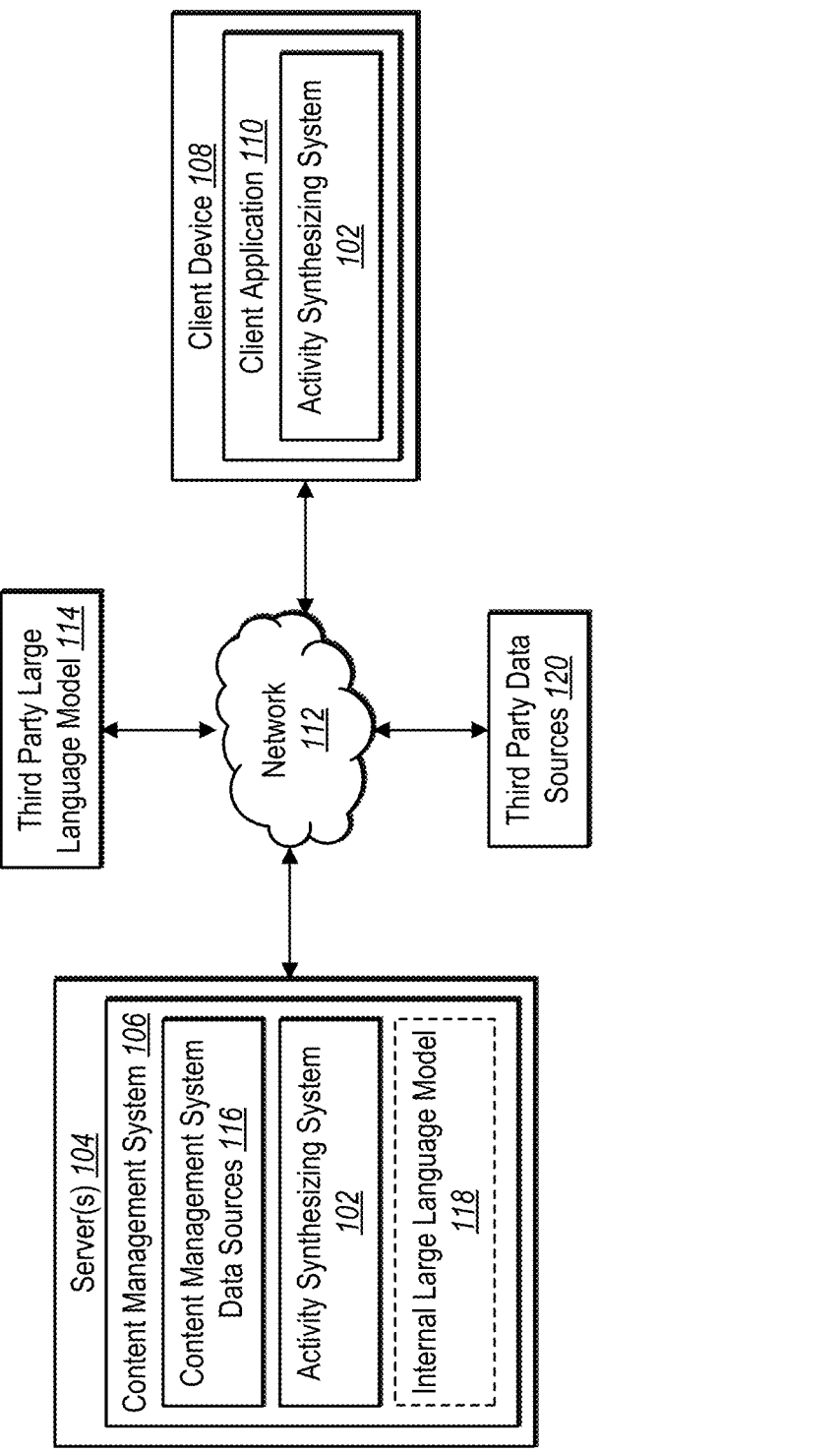
FIG. 1 illustrates a schematic diagram of an example environment of an activity synthesizing system in accordance with one or more embodiments.

This disclosure describes one or more embodiments of an activity synthesizing system that can process and analyze activity data to ultimately generate an activity synopsis for a user account. Indeed, the activity synthesizing system can aggregate activity data items comprising activity data indicating a user interaction within one or more computing environments for a user account. For example, the activity synthesizing system can aggregate the activity data items from various sources, including a document management system, native client applications, web applications, electronic messaging applications (e.g., instant messaging applications, email applications), video call applications, internet browser applications, as well as other sources described herein. The activity synthesizing system can utilize a machine learning model, such as a large language model, to transform the activity data items to synthesized activity items. The activity synthesizing system can utilize a machine learning model, such as a large language model, to process the synthesized activity items and generate an activity meta summary for a specified timeframe. Moreover, the activity synthesizing system can utilize the activity meta summary to determine a subset of synthesized activity items for the specified timeframe, and provide the subset of synthesized activity items in an activity synopsis to a client device associated with the user account.

As just mentioned, the activity synthesizing system can aggregate activity data items from one or more sources (e.g., content management systems, applications, electronic messaging services, internet browsers). The activity data items can be elements of computer code that include contextual content indicating a user interaction of a user account within one or more computing environments. The activity synthesizing system can extract or otherwise gain access to the activity data items from the multiple sources. For example, the activity synthesizing system can aggregate activity data items from a content management system based on a user account editing a document, from an email sent by the user account, from a video attended by the user account, or from a website visited by the user account. In one or more embodiments, the user account is an account on a content management system that is connected to the various other computing applications and environments through connectors (e.g., APIs) to collect and aggregate data from the various sources.

After aggregating the activity data items, the activity synthesizing system can utilize a large language model (LLM) to transform the activity data items to synthesized activity items. The synthesized activity items can be an aggregation of the contextual information indicating an interaction of a user account within one or more computing environments contained by the activity data items. The activity synthesizing system can transform the activity data items to the synthesized activity items by providing a synthesizer prompt and the activity data items to the LLM. The activity synthesizing system can structure the synthesizer prompt to include an instruction to transform the activity data items to the synthesized activity items.

After transforming the activity data items to the synthesized activity items, the activity synthesizing system can generate an activity meta summary for a specified time frame by utilizing the LLM to process the synthesized activity items. Indeed, the activity synthesizing system can generate the activity meta summary for the specified timeframe by generating a meta prompt and providing the meta prompt and the synthesized activity items to the LLM. The activity synthesizing system can structure the meta prompt to include a prompt instruction to transform the activity data items to the synthesized activity items for the specified timeframe. In addition to the specified timeframe, the activity synthesizing system can include an instruction in the meta prompt to generate the activity meta summary according to one or more additional vectors. For example, the one or more additional vectors can include a people vector that can be used to focus the activity meta summary on collaboration events between the user account and a second user account. Similarly, an additional vector can include an operational vector that can focus the activity meta summary on operational initiative events for a specified operational initiative in which the user account is participating. As will be described below, in some embodiments, two or more vectors can be used to generate the activity meta summary.

After generating the activity meta summary, the activity synthesizing system can determine a subset of the synthesized activity items based on the meta summary. The activity synthesizing system can identify the subset of synthesized activity items according to the one or more impact metrics. Specifically, the activity synthesizing system can utilize an impact metric to determine a level of importance for each of the synthesized activity items. For example, the activity synthesizing system can determine to use an impact metric of recency and select the subset of synthesized activity items according to the activity meta summary and the most recent of the synthesized activity items.

Upon identifying the subset of synthesized activity items for the specified timeframe, the activity synthesizing system can provide the subset of synthesized activity items for the specified timeframe for display on a client device associated with the user account. For example, the activity synthesizing system can provide the subset of synthesized activity items in an activity synopsis for display on the client device via an application, a notification system, or through an email.

As suggested above, the activity synthesizing system can provide several improvements and/or advantages over traditional online computing systems. For example, the activity synthesizing system can improve navigational efficiency compared to traditional systems. Indeed, as opposed to traditional systems that require navigation across multiple digital content items, across multiple applications and multiple graphical user interfaces to determine changes and/or activities for the multiple content items, the activity synthesizing system can track changes and/or activities across the multiple content items and provide an activity synopsis of the changes and/or activities. In addition, the activity synthesizing system further increases efficiency compared to traditional systems by utilizing one or more predetermined vectors to filter the information in the activity synopsis.

In addition to improved navigational efficiency, the activity synthesizing system can also provide improved computational efficiency. By providing the activity synopsis, the activity synthesizing system can reduce data storage redundancy, provide minimized context switching, streamline data processing, and provide faster data access, among other efficiency gains.

As illustrated by the foregoing discussion, the present disclosure utilizes a variety of terms to describe features and benefits of the activity synthesizing system. Additional detail is hereafter provided regarding the meaning of these terms as used in this disclosure. As used herein, the term "digital content item" (or simply "content item") refers to a digital object or a digital file that includes information interpretable by a computing device (e.g., a client device) to present information to a user. A digital content item can include a file or a folder such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is siloed to a particular computer application but is not necessarily accessible via a file system or via a network connection. A digital content item can be editable or otherwise modifiable and can also be sharable from one user account (or client device) to another. In some cases, a digital content item is modifiable by multiple user accounts (or client devices) simultaneously and/or at different times.

As mentioned, the activity synthesizing system can aggregate activity data items from one or more data sources. As used herein, the term "activity data item" refers to digital data associated with a data source, the digital data representing activity associated with a user account. An activity data item can a type of digital content activity or item, such as a calendar entry for a meeting, a social media activity, an e-commerce transaction, an online survey, an action relating to a digital content item (e.g., creating, uploading, downloading, sharing, editing), an email, an instant message, a phone call, and/or a video call, among others. An activity data item can include one or more types of metadata, such as descriptive metadata (e.g., information that describes the content and/or context of a data source), structural metadata (e.g., information that describes how a data source is organized and/or the format of the data source), administrative metadata (e.g., information used for managing a data source, including details about ownership, rights, and usage), technical metadata (e.g., information about the technical aspects of how a data source was created or captured), and/or provenance metadata (e.g., information about the history and/or origin of a data source, including changes and/or modifications made over time).

As noted, the activity synthesizing system can transform the activity data items to synthesized activity items. As used herein, the term "synthesized activity items" refers to a unified format for the activity data items that can unify activity data items with different data structures from different data sources. For example, the synthesized activity items can be a textual description of the activity data items. Certain items of the synthesized activity items can summarize multiple activity data items.

As noted, the activity synthesizing system can generate an activity meta summary for a specified timeframe by processing the synthesized activity items with a large language model. As used herein, the term "activity meta summary" refers to a contextualized summary of the synthesized activity items. The activity synthesizing system can generate the activity meta summary according to one or more of a predetermined timeframe, collaboration events, or operational initiatives, among others.

Along these lines, the term "large language model" refers to a set of one or more machine learning models trained to perform computer tasks to generate or identify computing code and/or data in response to trigger events (e.g., user interactions, such as text queries and button selections). In particular, a large language model can be a neural network (e.g., a deep neural network) with many parameters trained on large quantities of data (e.g., unlabeled text) using a particular learning technique (e.g., self-supervised learning). For example, a large language model can include parameters trained to generate or identify computing code and/or data based on various contextual data, including information from historical user account behavior.

Relatedly, as used herein, the term "machine learning model" refers to a computer algorithm or a collection of computer algorithms that automatically improve for a particular task through iterative outputs or predictions based on use of data. For example, a machine learning model can utilize one or more learning techniques to improve in accuracy and/or effectiveness. Example machine learning models include various types of neural networks, decision trees, support vector machines, linear regression models, and Bayesian networks. In some embodiments, the activity synthesizing system utilizes a large language machine learning model in the form of a neural network.

Along these lines, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., task lists) based on a plurality of inputs provided to the neural network. In some cases, a neural network refers to an algorithm (or a set of algorithms) that implements deep learning techniques to model high-level abstractions in data. A neural network can include various layers such as an input layer, one or more hidden layers, and an output layer that each perform tasks for processing data. For example, a neural network can include a deep neural network a convolutional neural network, a recurrent neural network (e.g., an LSTM), a graph neural network, or a large language model.

As noted, the activity synthesizing system generate a synthesizer prompt to transform the activity data items to synthesized activity items. As used herein, the term "synthesizer prompt" refers to a set of instructions designed to cause a large language model to perform a particular task or generate a particular output. In addition to the set of instructions, the synthesizer prompt can include additional data, such as profile data associated with a user account or activity data items, and will be further described below.

As mentioned, the activity synthesizing system can generate a meta prompt to generate the activity meta summary.

As used herein, the term "meta prompt" refers to a set of instructions designed to cause a large language model to perform a particular task or generate a particular output. In addition to the set of instructions, the synthesizer prompt can include additional data, such as profile data associated with a user account or activity data items, and will be further described below.

As noted, the activity synthesizing system can identify the subset of synthesized activity items according to an impact metric. As used herein, the term "impact metric" refers to a measure of importance for each of the synthesized activity items. For example, an impact metric can be a scalar value between 0-10, where a higher scalar value indicates a larger measure of importance. For example, the activity synthesizing system can determine an impact metric according to how many times a digital content item was used accessed, or otherwise interacted with. Moreover, the activity synthesizing system can determine an impact metric according to how recently a digital content item was created or otherwise modified. Indeed, the activity synthesizing system can determine an impact metric according to a corporate hierarchy (e.g., in some cases the activity synthesizing system can determine that collaboration events with a CEO of a corporation are more important, whereas in others the activity synthesizing system can determine that collaboration events with payroll personnel are more important).

In some embodiments, the activity synthesizing system can determine collaboration events between a user account and a second user account. As used herein, the term "collaboration event" refers to a form of interaction between the user account and the second user account. For example, a collaboration event can be an email or other form of communication (e.g., an instant message, a telephonic call, a video call, or a meeting event in a digital calendar) between the user account and the second user account. Additionally or alternatively, a collaboration event can be cooperation between the user account and the second user account on a content item.

In some embodiments, the activity synthesizing system can identify an operational initiative. As used herein, the term "operational initiative event" refers to an activity data item associated with an organizational objective (e.g., an activity data item associated with a specific project). For example, an operational initiative event can be an indication of a conference call, a task write-up data item, data collection for a task, an experiment design data item, an advertising campaign data item, an event logistics data item, a safety compliance data item, an interview data item, a project proposals or report data item, a customer inquiry data item, or a design blueprint data item, among others.

As noted, the activity synthesizing system can provide a client device a notification of an activity synopsis. As used herein, the term "activity synopsis" refers to a subset of synthesized activity items provided on a client device associated with a user account. For example, an activity synopsis can be a list of a subset of synthesized activity items provided via a graphical user interface that the activity synthesizing system generated and identified according to one or more predetermined vectors. The activity synopsis can contain links to one or more of the synthesized activity items. In addition, the activity synopsis can include a summary of the list of activity items, and in some embodiments, include options to save and/or share the information contained in the activity synopsis.

Additional detail regarding the activity synthesizing system will now be provided with reference to the figures. For example, FIG. 1 illustrates a schematic diagram of an example system environment for implementing an activity synthesizing system 102 in accordance with one or more implementations. An overview of the activity synthesizing system 102 is described in relation to FIG. 1. Thereafter, a more detailed description of the components and processes of the activity synthesizing system 102 is provided in relation to the subsequent figures.

As shown, the environment includes server(s) 104, a client device 108, a third-party large language model 114, third-party data sources 120, and a network 112. Each of the components of the environment can communicate via the network 112, and the network 112 may be any suitable network over which computing devices can communicate. Example networks are discussed in more detail below in relation to FIGS. 7-8.

As mentioned above the example environment includes a client device 108. The client device 108 can be one of a variety of computing devices, including a smartphone, a tablet, a smart television, a desktop computer, a laptop computer, a virtual reality device, an augmented reality device, or another computing device as described in relation to FIGS. 8-9. The client device 108 can communicate with the server(s) 104 via the network 112. For example, the client device 108 can receive user input from a user interacting with the client device 108 (e.g., via a client application 110) to, for instance, access, generate, modify, or share a content item, to collaborate with a co-user of a different client device, or to select a user interface element. In addition, the activity synthesizing system 102 on the server (s) 104 can receive information relating to various interactions with content items and/or user interface elements based on the input received by the client device 108 (e.g., to generate a task list and/or to execute one or more tasks).

As shown, the client device can include a client application 110. In particular, the client application 110 may be a web application, a native application installed on the client device 108 (e.g., a mobile application, a desktop application, etc.), or a cloud-based application where all or part of the functionality performed by the server(s) 104. Based on instructions from the client application 110, the client device 108 can present or display information, including a catalyst interface for presenting graphical visualizations of task lists as well as interface elements for executing a monitoring progress of various tasks.

As illustrated in FIG. 1, the example environment also includes the server(s) 104. The server(s) 104 may generate, track, store, process, receive, and transmit electronic data, such as digital content (e.g., content items), tasks, task lists, prompts, interface elements, interactions with digital content items, interactions with interface elements, and/or interactions between user accounts or client devices. In addition, the server(s) 104 can transmit data to the client device 108 in the form of synthesized activity items transformed from the activity data items, or an activity meta summary generated from the synthesized activity items, or a subset of the synthesized activity items identified based on the activity meta summary. Indeed, the server(s) 104 can communicate with the client device 108 to send and/or receive data via the network 112.

As shown, the server(s) can also include content management system data sources 116. The content management system data sources 116 can be native to, housed or hosted on, and/or maintained by the content management system 106. The activity synthesizing system 102 can aggregate activity data items from the content management system data sources 116. In addition, the server(s) 104 can also include an internal large language model 118 that is native to, housed or hosted on, and/or maintained by the content management system 106. In some implementations, the server(s) 104 include(s) a number of server devices distributed across the network 112 and located in different physical locations. The server(s) 104 can comprise one or more content servers, application servers, communication servers, web-hosting servers, machine learnings servers, and other types of servers.

As shown in FIG. 1, the server(s) 104 can also include the activity synthesizing system 102 as part of the content management system 106. The content management system 106 can communicate with the client device 108 to perform various functions associated with the client application 110 such as managing user accounts, managing content collections, managing content items, and facilitating user interaction with the content collections and/or content items. Indeed, the content management system 106 can include a network-based smart cloud storage system to manage, store, and maintain content items and related data across numerous user accounts, including user accounts in collaboration with one another. In some embodiments, the activity synthesizing system 102 and/or the content management system to utilize third-party data sources to store and access information such as digital content items and/or activity data items.

FIG. 1 further illustrates a third-party large language model 114. A third-party server can host the third-party large language model 114 for access by the activity synthesizing system 102 (e.g., as an alternative to the server(s) 104 hosting or housing the internal large language model 118). For example, the third-party large language model 114 can be external to the activity synthesizing system 102, but the activity synthesizing system 102 can nevertheless access and utilize the third-party large language model 114 via one or more plugins, APIs, or other network-based access protocols.

Although FIG. 1 depicts the activity synthesizing system 102 located on the server(s) 104, in some implementations, the activity synthesizing system 102 may be implemented by (e.g., located entirely on or in part on) one or more other components of the environment. For example, the activity synthesizing system 102 may be implemented by the client device 108 and/or a third-party device. For example, the client device 108 can download all or part of the activity synthesizing system 102 for implementation independent of, or together with, the server(s) 104.

In some implementations, though not illustrated in FIG. 1, the environment may have a different arrangement of components and/or may have a different number or set of components altogether. For example, the client device 108 may communicate directly with the activity synthesizing system 102, bypassing the network 112. As another example, the environment can include a database located external to the server(s) 104 (e.g., in communication via the network 112) or located on the server(s), on a third-party system, and/or on the client device 108.

Figure 2:
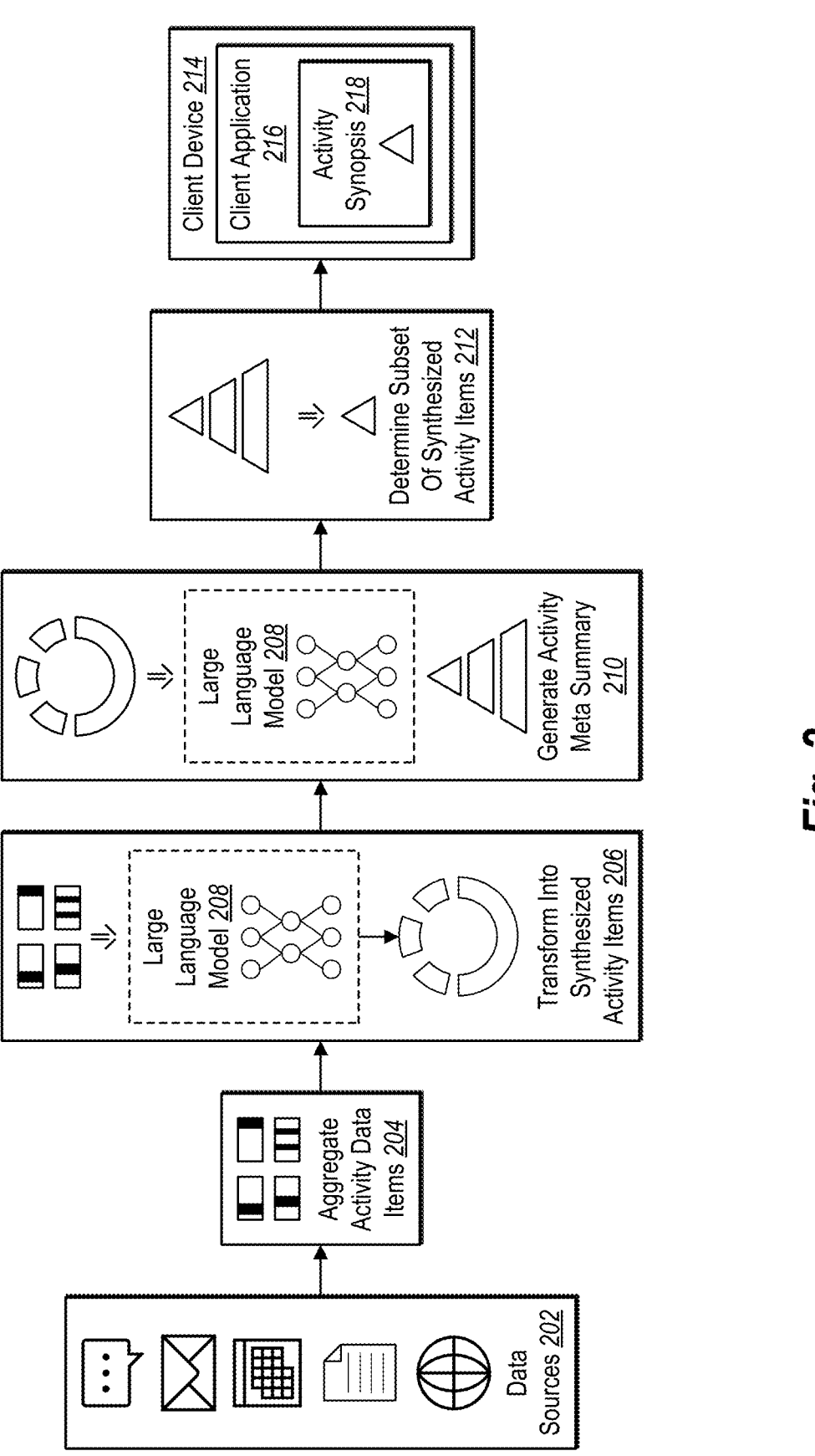
FIG. 2 illustrates an example overview of aggregating activity data items, transforming activity data items into synthesized activity items, generating an activity meta summary, and determining a subset of synthesized activity items.

As mentioned above, the activity synthesizing system 102 can aggregate activity data items from one or more data sources, such as the content management system data sources 116 or the third-party data sources 120. Additionally, the activity synthesizing system 102 can transform the activity data items to synthesized activity items utilizing a large language model to synthesize the activity data items. Indeed, the activity synthesizing system 102 can generate an activity meta summary for a specified timeframe by processing the synthesized activity items with the large language model. Thereafter, the activity synthesizing system 102 can identify, based on the meta summary, a subset of synthesized activity items. FIG. 2 illustrates an overview of aggregating activity data items, transforming the activity data items to synthesized activity items, generating the activity meta summary from the synthesized activity items, and identifying the subset of synthesized activity items based on the activity meta summary.

As illustrated in FIG. 2, in some embodiments, the activity synthesizing system 102 performs an act 204 to aggregate activity data items from data sources 202. The data sources 202 can be: the content management system data sources 116 of FIG. 1 (e.g., the data sources 202 can be native to the content management system 106 of FIG. 1); the third-party data sources 120 of FIG. 1 (e.g., the data sources 202 can be external to the content management system 106 of FIG. 1); or messages from messaging applications, such as instant messages from Slack, emails from an email application, such as Outlook, messages from video communication applications, such as Zoom or Teams. Additionally, the data sources 202 can be: electronic calendars (e.g., Google Calendar, Microsoft Outlook Calendar, Apple Calendar, Fantastical, Any.do, etc., among others), Microsoft Word Documents, Microsoft PowerPoints, Microsoft Excel sheets; or web browsers, such as Google Chrome, Safari, Microsoft Edge, or Mozilla Firefox, among others.

As shown, the activity synthesizing system 102 performs act 204 to aggregate activity data items from the data sources. The activity synthesizing system 102 can utilize a variety of methods to perform act 204, such as pushing, pulling, fetching, webhooks, API integration, web scraping, extract transform load (ETL), data streaming, file transfer protocol (FTP), database duplication, MiddleWare integration, RSS feeds, batch processing, real-time data sync, or cloud storage integration, among others. The activity synthesizing system 102 can determine to utilize a particular method of data aggregation according to the type of data source. For example, the activity synthesizing system 102 can determine to utilize web scraping to perform act 204 to aggregate activity data items where the data source 202 is a web browser. The activity synthesizing system 102 can perform act 204 to aggregate activity data items from multiple data sources 202.

Moreover, as part of performing act 204, the activity synthesizing system 102 can associate and store the activity data items with respect to a user account. For example, where the activity synthesizing system 102 is operating on a client device (such as the client device 108 of FIG. 1), the activity synthesizing system 102 can associate the activity data items with a user account associated with and/or operating on the client device and store the activity data items on the client device, in cloud storage, or remotely. The activity synthesizing system 102 can perform act 204 to aggregate the activity data items periodically (e.g., once every second, minute, hour, three hours, day, etc.).

Indeed, the activity synthesizing system 102 can determine a frequency for which to perform act 204 according to the data source 202. For example, the activity synthesizing system 102 can aggregate activity data items from messaging applications, such as Slack, at a higher frequence than email applications, web applications, or other applications such as Microsoft Word etc. The activity synthesizing system 102 can monitor activity levels of various digital content items and determine a frequency with which to perform act 204 according to the activity level of the digital content item. For example, the activity synthesizing system 102 can detect a high activity level in a Microsoft Word document (e.g., edits are being made, multiple user accounts have the document open simultaneously) and determine to increase the frequence of aggregating activity data items compared to a Microsoft Word document that is dormant.

As illustrated, the activity synthesizing system 102 can perform act 206 to transform the activity data items into synthesized activity items. Indeed, the activity synthesizing system 102 can utilize a large language model 208 to perform act 206. For example, the activity synthesizing system 102 can transform the activity data items from the data sources 202 into synthesized activity items having a uniform format (e.g., natural language descriptions of the activity data items). The large language model 208 can be the third-party large language model 114 or the internal large language model 118 of FIG. 1. Indeed, the activity synthesizing system 102 can utilize act 206 to take multiple activity data items from multiple data sources 202 having non-uniform, disorganized data formats and transform them into a uniform data structure. More information regarding act 206 can be found below with regards to FIG. 3A.

As illustrated, the activity synthesizing system 102 can perform act 210 to generate an activity meta summary. Indeed, the activity synthesizing system 102 can utilize a large language model 208 to perform act 210 to generate an activity meta summary from the synthesized activity items. The large language model 208 can be the third-party large language model 114 or the internal large language model 118 of FIG. 1. The activity synthesizing system 102 can perform act 210 to generate the activity meta summary for a specified timeframe. For example, the activity synthesizing system 102 can determine to generate the activity meta summary for a day, a week, month, quarter, or year, among others. The activity synthesizing system 102 can determine the specified timeframe and use the specified timeframe to filter the synthesized activity items when generating the activity meta summary. Moreover, in some embodiments, the activity synthesizing system 102 can generate activity meta summary according to additional vectors, such as collaboration events or operational initiatives. Indeed, the activity synthesizing system 102 can utilize act 210 to generate a contextualized analysis of the synthesized activity items (e.g., the activity synthesizing system 102 can determine one or more groups from the synthesized activity items and determine relationships between the one or more groups). More information regarding act 210 can be found below with regards to FIG. 3B and FIG. 4.

As illustrated, the activity synthesizing system 102 can perform act 212 to determine a subset of the synthesized activity items. Specifically, the activity synthesizing system 102 can determine the subset of synthesized activity items for the specified timeframe based on the activity meta summary. The activity synthesizing system 102 can utilize the contextualized analysis of the activity meta summary to determine the subset of synthesized of activity items. For example, the activity synthesizing system 102 can determine the subset of synthesized activity items for a specified timeframe according to a group generated in the activity meta summary, such as projects of a certain type, collaboration events with another user account, or activities completed within a subset of the specified timeframe. The activity synthesizing system 102 can further determine the subset of synthesized activity items based on relative impact metrics associated with the synthesized activity items in the activity meta summary. In some embodiments, the activity synthesizing system 102 can determine the subset of the synthesized activity items according to input from a user account.

As illustrated, the activity synthesizing system 102 can provide a notification of an activity synopsis 218 in a client application 216 of a client device 214. The client application 216 can be the client application 110 of FIG. 1. The client device 214 can be the client device 108 of FIG. 1. Based on receiving an indication of a user interaction with the notification, the activity synthesizing system 102 can provide the activity synopsis to the client application 216. For example, the activity synthesizing system 102 can utilize various methods to determine the indication of the user interaction with the notification, such as event listeners, focus and blur events, touch events, mouse events, keyboard events, interaction times, API calls, or tracking pixels and beacons, among others. The activity synthesizing system 102 can display the subset of synthesized activity items in the client application 216 as the activity synopsis 218 (e.g., the activity synopsis 218 can be an embodiment of the subset of synthesized activity items displayed within an application or some other form of interface).

Figure 3B:
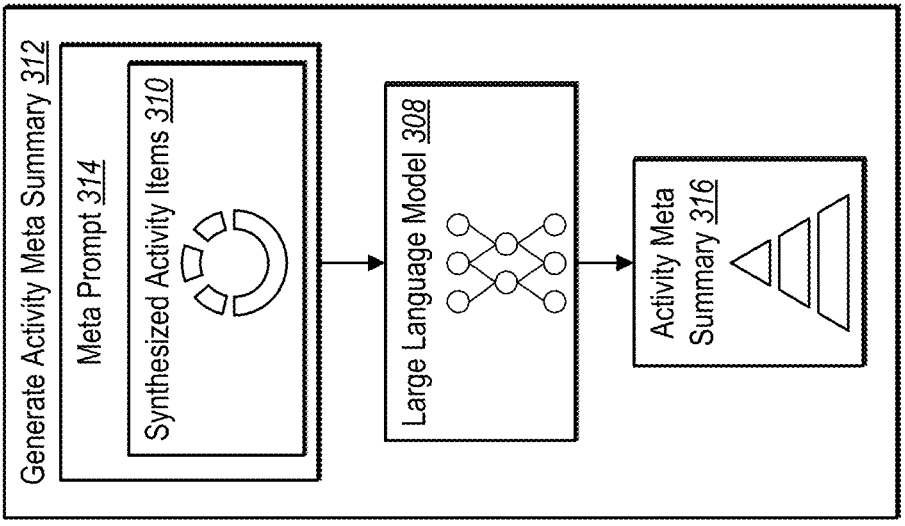
FIG. 3B illustrates an example diagram for utilizing a machine learning model to generate an activity meta summary from synthesized activity items.
Figure 3A:
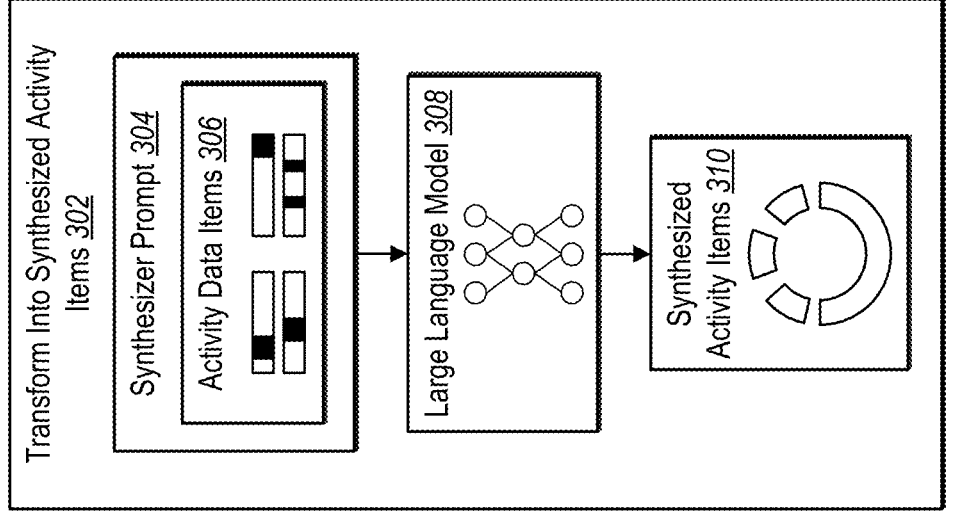
FIG. 3A illustrates an example diagram for utilizing a machine learning model to transform activity data items into synthesized activity items.

As noted above, in some embodiments, the activity synthesizing system 102 utilizes a machine learning model to transform the activity data items into the synthesized activity items. FIG. 3A illustrates an example of the activity synthesizing system 102 utilizing a large language model to transform the activity data items into synthesized activity items. For example, and as illustrated in FIG. 3A, the activity synthesizing system 102 can perform act 302 to transform the activity data items into synthesized activity items. Specifically, the activity synthesizing system 102 can generate a synthesizer prompt 304 and provide the synthesizer prompt 304 along with the activity data items 306 to a large language model 308 (e.g., the internal large language model 118 or the third-party large language model 114 of FIG. 1). Accordingly, the activity synthesizing system 102 can cause the large language model 308 to transform the activity data items 306 into synthesized activity items 310.

As part of act 302, the activity synthesizing system 102 can clean and sanitize the activity data items 306 and verify the data format(s) of the activity data items (e.g., ensures that the activity items are in recognizable, valid formats, such as JSON, XML, or CSV, among others). Additionally, the activity synthesizing system 102 can parse and organize the activity data items 306 according to various criteria (e.g., a data format of the activity data item, a data source of the activity data item, or an amount of time associated with the activity data item, among others) prior to providing activity data items 306 to the large language model.

In some embodiments, the activity synthesizing system 102 can determine which activity data items 306 to include in the synthesizer prompt 304. For example, the activity synthesizing system 102 select the activity data items 306 according to a date, an operational initiative (e.g., a project type), a collaboration event, or a token limit of the large language model 308.

The activity synthesizing system 102 can generate the synthesizer prompt 304 that includes the activity data items 306 and a prompt instruction to transform the activity data items 306 to the synthesized activity items 310. Specifically, the activity synthesizing system 102 can structure the prompt instruction to be a text request (e.g., natural language text) with instructions to convert the activity data items 306 into a uniform data format. For example, the activity synthesizing system 102 can structure the prompt instruction to include a request for the large language model 308 to provide a natural language description of each of the activity data items 306 (e.g., "describe each of the activity data items in a sentence"). The activity synthesizing system 102 can structure the prompt instruction to request the large language model 308 to output the synthesized activity items 310 in the form of unstructured text or semi-structured text, or other data formats.

In some embodiments, the activity synthesizing system 102 can utilize several predetermined prompt instructions to include in the synthesizer prompt 304. The activity synthesizing system 102 can determine which of the predetermined prompt instructions to utilize according to various attributes of the activity data items. For example, the activity synthesizing system 102 can select the activity data items 306 to include in the synthesizer prompt 304 and determine the prompt instruction according to a data format of the activity data items (e.g., the activity synthesizing system 102 can utilize a first prompt instruction for JSON, a second prompt instruction for XML, a third prompt instruction for HTML, a fourth prompt instruction for TXT, a fifth prompt instruction for DOCX, a sixth prompt instruction for PDF, etc.). Indeed, the activity synthesizing system 102 can select activity data items 306 having multiple data formats to include in the synthesizer prompt 304 and determine the prompt instruction according to the multiple data formats.

Additionally, in some embodiments, the activity synthesizing system 102 can determine to include activity data items 306 of one or more types in the synthesizer prompt 304. The activity synthesizing system 102 can determine the prompt instruction according to the one or more types of the activity data items 306. For example, the activity synthesizing system 102 can determine to use a first prompt instruction for activity data items 306 relating to forms of communication between the user account and one or more additional user accounts (e.g., Slack Messages, emails, video calls, etc.), a second prompt instruction for operational objectives, a third prompt instruction for collaboration events, among others. In some embodiments, the activity synthesizing system 102 can determine the prompt instruction according to a data format of the activity data items 306 and a type of the activity data items 306. In other embodiments, the prompt instructions can be selected based on the type of meta summary the activity synthesizing system 102 is generating. For example, if the activity synthesizing system is generating a general activity meta summary for a user account for a time period (e.g., a specified timeframe), the activity synthesizing system 102 can select a first set of prompt instructions. Alternatively, if the activity synthesizing system 102 is generating a user-specific meta summary (e.g., a meta summary detailing collaboration events between the user account and another user account), then the activity synthesizing system 102 can select a second set of prompt instructions.

In some embodiments, the activity synthesizing system 102 can generate the synthesizer prompt 304 to include a prompt instruction for the large language model 308 to include a tag in each of the synthesized activity items 310 indicating a type of each of the synthesized activity items 310. For example, the activity synthesizing system 102 can determine activity data types according to one or more vectors such as operational initiatives or collaboration events with another user profile. Additionally, the activity synthesizing system 102 can generate the synthesizer prompt 304 to include an instruction to include a time stamp in each of the synthesized activity items 310. These tags can later be used by the activity synthesizing system 102 to determine impact metrics and/or generate the activity synopsis, as will be discussed with reference to FIG. 4.

Moreover, the activity synthesizing system 102 can determine a metadata category for each of the activity data items 306. The metadata category can include information about a digital content item associated with the activity data items 306. The activity synthesizing system 102 can generate the synthesizer prompt 304 to include an instruction to indicate the metadata category of the activity data items 306 that correspond to the synthesized activity items 310.

As illustrated in FIG. 3A, the activity synthesizing system 102 can provide the synthesizer prompt 304 comprising the prompt instruction and the activity data items 306 to the large language model 308. The activity synthesizing system 102 utilizes the large language model 308 to transform the activity data items 306 to synthesized activity items 310. Specifically, the activity synthesizing system 102 utilizes the large language model 308 to analyze the activity data items 306 and the prompt instruction.

As illustrated, the activity synthesizing system 102 can utilize the large language model 308 to transform the activity data items 306 into the synthesized activity items 310. The synthesized activity items 310 can be textualized descriptions of the activity data items 306. For example, an activity data item 306 can be an email from the user account to a second user account. The synthesized activity item 310 corresponding to this activity data item 306 can be a textualized description of the email that includes information about the user account and the second user account, a subject of the email, and/or content of the email, among others.

In some embodiments, a synthesized activity item 310 can correspond to one or more activity data items 306. For example, where multiple activity data items 306 correspond to an email chain between the user account and a second user account, one synthesized activity item 310 can correspond to the multiple activity data items 306 and provide a textualized summary of the multiple activity data items 306. In some embodiments, where a synthesized activity item 310 corresponds to multiple activity data items 306, the activity synthesizing system 102 can cause the large language model 308 to structure the synthesized activity item 310 with multiple layers of textualized summaries, wherein each successive layer contains more information than the previous layer. For example, the multiple activity data items 306 can be an email chain between the user account and the second user account. Indeed, the activity synthesizing system 102 can structure a synthesized activity item 310 to correspond to the multiple activity data items 306 and include multiple layers of information. Moreover, the activity synthesizing system 102 can cause a first layer of the multiple layers to include information about the user account, the second user account, and a subject of the email chain. Additionally, the activity synthesizing system 102 can cause a second layer of the multiple layers to include the information of the first layer, as well as a number of emails in the email chain. In some embodiments, the activity synthesizing system 102 can cause a third layer of the multiple layers to include the information of the second layer, as well as a summary of actionable items from the email chain, whereas in other embodiments, the activity synthesizing system 102 can cause the third layer of the multiple layers to include the information of the third layer as well as the summary of actionable items from the email chain.

As noted above, in some embodiments, the activity synthesizing system 102 performs act 312 to generate an activity meta summary. FIG. 3B illustrates an example of the activity synthesizing system 102 utilizing a large language model to generate the activity meta summary.

As illustrated in FIG. 3B, the activity synthesizing system 102 can perform act 312 to generate an activity meta summary 316. The activity synthesizing system 102 can generate the activity meta summary 316 from the synthesized activity items 310. Specifically, the activity synthesizing system 102 can generate a meta prompt 314 and provides the meta prompt 314 to a large language model 308 (e.g., the internal large language model 118 or the third-party large language model 114 of FIG. 1). The activity synthesizing system 102 can cause the large language model 308 to generate the activity meta summary 316 from the synthesized activity items.

As illustrated, the activity synthesizing system 102 can provide the meta prompt 314 to the large language model. The activity synthesizing system 102 can generate the meta prompt 314 to include a prompt instruction to generate the activity meta summary 316 using the synthesized activity items 310. Specifically, the activity synthesizing system 102 can structure the prompt instruction to be a text request (e.g., natural language text) to provide a contextualized summary of the synthesized activity items 310. For example, the activity synthesizing system 102 can structure the prompt instruction to include a request for the large language model to analyze each of the synthesized activity items 310, determine relationships between the synthesized activity items 310, and provide summaries of the synthesized activity items 310. Indeed, the activity synthesizing system 102 can also structure the prompt instruction to include an instruction to generate the activity meta summary 316 according to a specified timeframe. Moreover, the activity synthesizing system 102 can structure the prompt instruction to include an instruction to generate the activity meta summary 316 according to one or more vectors, such as collaboration events and/or operational initiatives, among others.

In some embodiments, the activity synthesizing system 102 can generate several predetermined prompt instructions to include in the meta prompt 314. The activity synthesizing system 102 can determine which of the predetermined prompt instructions to include in the meta prompt 314 according to various information described in the synthesized activity items 310. More information regarding generating the activity meta summary 316 according to a specified timeframe, as well as optionally according to collaboration events and/or operational initiatives, and determining which predetermined prompt instruction to include in the meta prompt 314 can be found below with regards to FIG. 4.

As illustrated, the activity synthesizing system 102 provides the meta prompt 314 to the large language model 308. The activity synthesizing system 102 can utilize the same large language model as was described in FIG. 3A (e.g., the large language model the activity synthesizing system 102 utilized to transform the activity data items 306 into synthesized activity items), or a different large language model. Specifically, the activity synthesizing system 102 utilizes the large language model 308 to analyze the synthesized activity items 310, determine relationships between the synthesized activity items, and provide a contextualized summary of the synthesized activity items 310 (e.g., the activity meta summary 316).

As illustrated, the activity synthesizing system 102 can utilize the large language model 308 to generate the activity meta summary 316 from the synthesized activity items 310. As previously mentioned, the activity meta summary 316 can be a contextualized summary of the synthesized activity items 310. The activity synthesizing system 102 can contextualize the activity meta summary with regards to a specified timeframe, collaboration events, and/or operational initiatives. As previously mentioned, more information regarding generating the activity meta summary 316 according to one or more vectors (e.g., the specified timeframe, the collaboration events, and/or the operational initiatives, among others) will be provided below with regard to FIG. 4.

Figure 4:
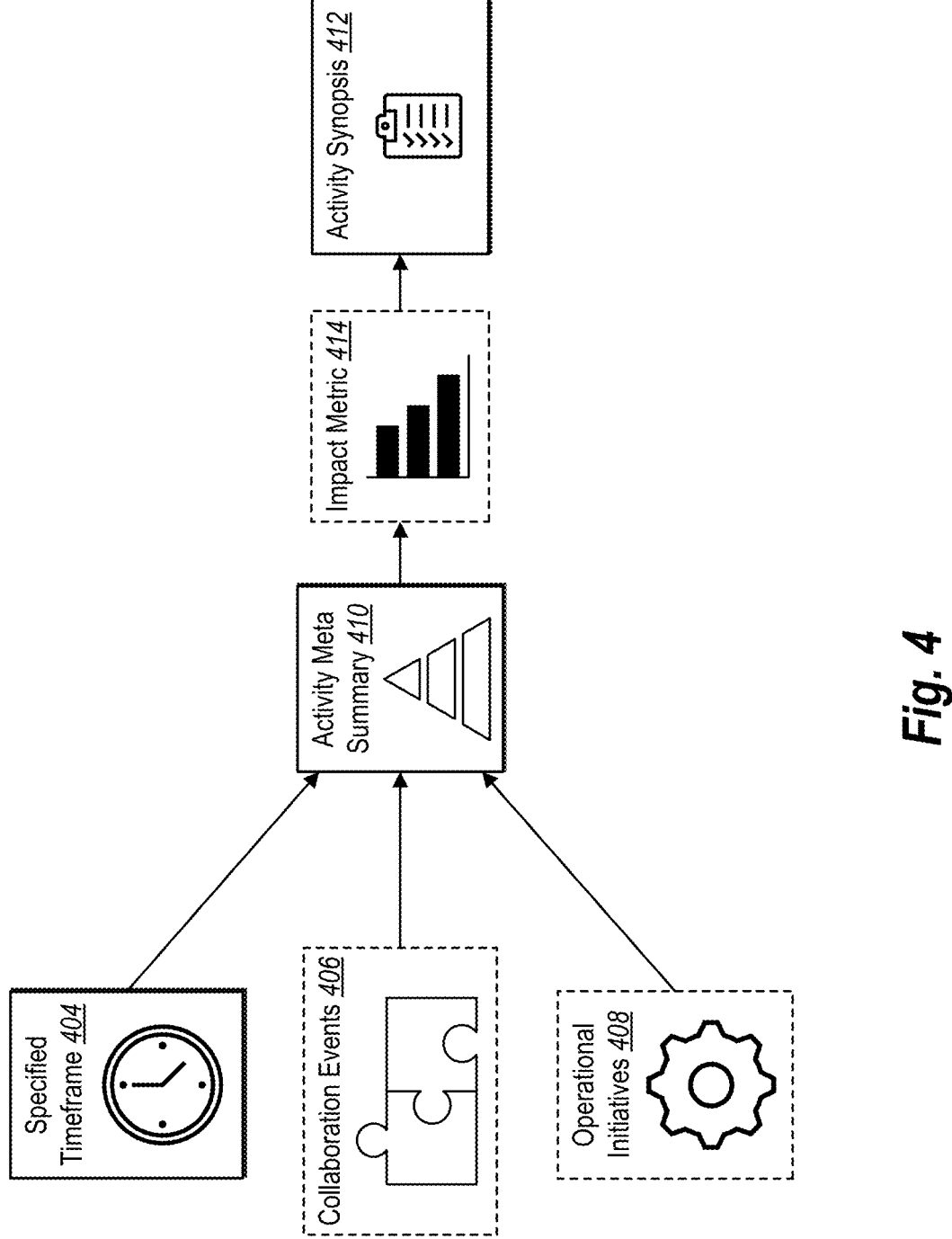
FIG. 4 illustrates an example diagram for generating an activity meta summary according to one or more predetermined vectors and generating an activity synopsis from an activity meta summary.

As noted above, in some embodiments, the activity synthesizing system 102 generates an activity meta summary. FIG. 4 illustrates the activity synthesizing system 102 generating the activity meta summary according to one or more predetermined vectors and generates an activity synopsis according to the activity meta summary.

As illustrated in FIG. 4, the activity synthesizing system 102 generates the activity meta summary 410 according to a specified timeframe 404. The activity meta summary 410 can be the activity meta summary 316 of FIG. 3. As discussed above, the activity synthesizing system 102 can utilize a meta prompt including a prompt instruction and synthesized activity items to generate the activity meta summary 410. The activity synthesizing system 102 can include a specified timeframe 404 in the prompt instruction for the meta prompt.

In some embodiments, the activity synthesizing system 102 can determine the specified timeframe 404 autonomously. Indeed, the activity synthesizing system 102 can determine the specified timeframe 404 according to several factors, such as a frequency of aggregating activity data items, a frequency of transforming activity data items into synthesized activity items, information contained in the activity data items, time stamps of activity data items, a subset of the activity data items, or input from a user account among others. Moreover, in some embodiments, the activity synthesizing system 102 determines the specified timeframe 404 to be daily, weekly, bi-weekly, monthly, quarterly, or annually, among others. In one or more embodiments, the specified timeframe is user-specified. For example, a user can provide input that defines a specific period of time, and accordingly, the activity synthesizing system 102 can generate a meta summary for the defined period of time.

As illustrated, in some embodiments, the activity synthesizing system 102 determines the activity meta summary 410 according to the specified timeframe 404 and one or more collaboration events 406. As mentioned above, a collaboration event 406 can be a form of interaction between a user account (e.g., a first user account) and a second user account. For example, a collaboration event 406 can be: instant messaging between the first and second user accounts (e.g., Slack, Microsoft Teams Chat, WhatsApp, Facebook Messenger, Discord Direct Message, Skype Chat, among others), email communications between the first and second user accounts, collaboration on/in digital content items (e.g., Google Docs co-editing, Microsoft Word co-editing, Dropbox Paper collaboration, Notion shared document editing, among others), digital content item sharing and/or transfer between the first and second user accounts (e.g., Google Drive file sharing, Dropbox file sharing, OneDrive file sharing, WeTransfer file sending, among others) video and/or voice communication between the first and second user accounts (e.g., Zoom meeting, Microsoft Teams meeting, Skype video call, Discord Voice Channel, among others), project management tools utilized by the first and second user accounts (e.g., Trello Board collaboration, Asana task assignment, Jira ticket commenting, Monday.com project updates, among others), real-time collaboration between the first and second user accounts (e.g., Miro whiteboard sharing, Figma Design Collaboration, Adobe XD co-editing, Lucidchart diagram sharing, among others), code collaboration between the first and second user accounts (e.g., GitHub pull request revises, Bitbucket Code Comments, CodePen collaboration, among others), social media interactions between the first and second user accounts (e.g., creating and/or interacting with content on LinkedIn, X (formerly Twitter), Instagram, Reddit, or Facebook, among others) interactions between the first and second user accounts on content management systems (WordPress Post editing, Drupal content collaboration, Confluence document editing, among others), interactions between the first and second user accounts on customer support platforms (e.g., Zendesk ticket collaboration, Freshdesk ticket comments, Intercom chat interactions, among others) interactions between the first and second user accounts on online learning platforms (e.g., Coursera peer reviews, EdX discussion forums, Moodle collaboration spaces, Blackboard group projects, among others) cloud storage and syncing interactions between the first and second user accounts (e.g., Google Drive shared folders, Dropbox team spaces, OneDrive shared libraries, among others), calendar and scheduling interactions between the first and second user accounts (e.g., Google Calendar event invites, Microsoft Outlook Meeting Requests, Doodle polls, Calendly scheduling, among others), virtual whiteboard interactions between the first and second user accounts (e.g., Google Jamboard collaboration, Mural interactive spaces, Conceptboard collaboration, among others) online survey/form interactions between the first and second user accounts (e.g., Google Forms collaboration, Typeform shared forms, SurveyMonkey shared surveys, among others), cryptocurrency and blockchain interactions between the first and second user accounts (e.g., Shared Wallet transactions, DApp interactions, among others), remote desktop and support interactions between the first and second user accounts (e.g., Team Viewer session sharing, AnyDesk remote control, among others), financial tool interactions between the first and second user accounts (e.g., shared budgeting in YNAB, Splitwise expense sharing, PayPal money requests, among others), or any other type of interaction between the first and second user accounts.

As illustrated, the activity synthesizing system 102 can generate the activity meta summary 410 according to the specified timeframe 404 and one or more operational initiatives 408. Specifically, the activity synthesizing system 102 can determine operational initiative events related to the one or more operational initiatives 408. As mentioned above, an operational initiative event can be an activity data item associated with an organizational objective. Accordingly, when the activity synthesizing system 102 generates the activity meta summary 410 according to the specified timeframe 404 and the one or more operational initiatives 408, the activity synthesizing system 102 structures the activity meta summary 410 around one or more organizational objectives (as opposed to structuring the activity meta summary 410 around interactions (e.g., collaboration events) between the first and second user accounts). Therefore, when the activity synthesizing system 102 generates the activity meta summary 410 according to the specified timeframe 404 and the one or more operational initiatives 408, the activity synthesizing system 102 focuses the activity meta summary 410 on organizational objectives rather than interactions with additional user accounts. Accordingly, when the activity synthesizing system 102 generates the activity meta summary 410 according to the specified timeframe 404 and the one or more operational initiatives 408, the activity meta summary 410 may contain collaboration events 406 between the user account (e.g., the first user account) and many other user accounts, where the collaboration events 406 are related to the one or more operational initiatives 408.

Indeed, in some embodiments, the activity synthesizing system 102 can determine one or more operational initiative events relating to the one or more operational initiatives 408. Accordingly, an operational initiative event can be any of the examples mentioned above with regard to the collaboration events 406, but with respect to the operational initiative 408 instead of the second user account.

As illustrated, the activity synthesizing system 102 can generate the activity meta summary 410 according to one or more predetermined vectors (e.g., the specified timeframe 404, the collaboration events 406, and/or the operational initiatives 408). Indeed, the activity synthesizing system 102 generates the activity meta summary 410 to be a contextualized summary of the synthesized activity items. Specifically, the activity synthesizing system 102 can contextualize the activity meta summary 410 according to the one or more predetermined vectors. For instance, the activity synthesizing system 102 can generate a meta summary for a complete operational initiative, meaning, the meta summary includes synthesized activity items associated with the operational initiative without regard to any specified timeframe. Alternatively, the activity synthesizing system 102 can generate a meta summary for a specified timeframe, for an operational initiative, and for collaboration events with a specific user account. Accordingly, one skilled in the art will realize any combination of the predetermined vectors can be used to generate a meta summary.

As illustrated, the activity synthesizing system 102 can generate the activity synopsis 412 according to the activity meta summary 410. Indeed, in some embodiments, the activity synthesizing system 102 generates the activity synopsis 412 according to the activity meta summary 410 and an impact metric 414. Specifically, the activity synthesizing system 102 can utilize the impact metric 414 to quantify a level of importance for each of the synthesized activity items. This can be done prior to creating a meta summary or after creating the meta summary. Accordingly, when the activity synthesizing system 102 generates the activity synopsis 412, the activity synthesizing system 102 can the activity meta summary 410 and the impact metric 414 to determine a subset of the synthesized activity items.

For example, when the activity synthesizing system 102 generates the activity meta summary 410 solely according to the specified timeframe 404 (e.g., the only predetermined vector used to generate the activity meta summary 410 is the specified timeframe 404, not the collaboration events 406 or the one or more operational initiatives 408), the activity synthesizing system 102 can then utilize an impact metric 414, such as a recency bias (e.g., the activity synthesizing system 102 implements a bias towards synthesized activity items that represent recent activity data items) to select the subset of synthesized activity items. In some embodiments, the activity synthesizing system 102 can utilize a frequency of collaboration between two user accounts as the impact metric 414. Additionally, the activity synthesizing system 102 can generate the activity meta summary 410 according to the specified timeframe 404 and one or more of the collaboration events 406 or the one or more operational initiatives 408, and can select the subset of synthesized activity items according to the activity meta summary 410 and the impact metric 414.

In other words, while the activity synthesizing system 102 generates the activity meta summary 410 as a contextualized summary of the synthesized activity items. Thereafter, the activity synthesizing system 102 can utilize the impact metric 414 to rank the synthesized activity items. Accordingly, the activity synthesizing system 102 selects the subset of synthesized activity items according to the contextualized summary provided by the activity meta summary 410 and, optionally, according to the measure of importance determined by the impact metric 414. Additional factors the activity synthesizing system 102 can use to determine an impact metric for a particular synthesized activity item can include: a relationship to a position in an organization chart (e.g., a synthesized activity item related to a CEO is ranked higher than a synthesized activity item with a peer), alignment with function/activity (e.g., a synthesized activity item relates to the core of a user accounts job function versus a synthesized activity item that relates to a peripheral function), number of related synthesized activity items, frequency of collaboration between user accounts, business type or relationship (e.g., activity data items and/or synthesized activity items relating to clients can be determined to have a higher level of importance) and/or user account preference.

Responsive to selecting the subset of synthesized activity items, the synthesized activity item can provide a client device associated with the user account a notification of an activity synopsis 412. Based on receiving an indication of user interaction with the notification, the synthesized activity item provides the activity synopsis including the subset of synthesized activity items for display on the client device. More information will be provided regarding the activity synopsis 412 below with regard to FIGS. 5A-5B.

Although not shown, in some embodiments, the activity synthesizing system 102 can include an outstanding operational initiative sequence in the activity synopsis. Specifically, the activity synthesizing system 102 can determine outstanding and/or incomplete operational initiatives from the synthesized activity items utilizing the activity meta summary. The activity synthesizing system 102 can include the outstanding operational initiatives along with a timeframe for completion of the outstanding operational initiative in the outstanding operational initiative sequence.

Figure 5A:
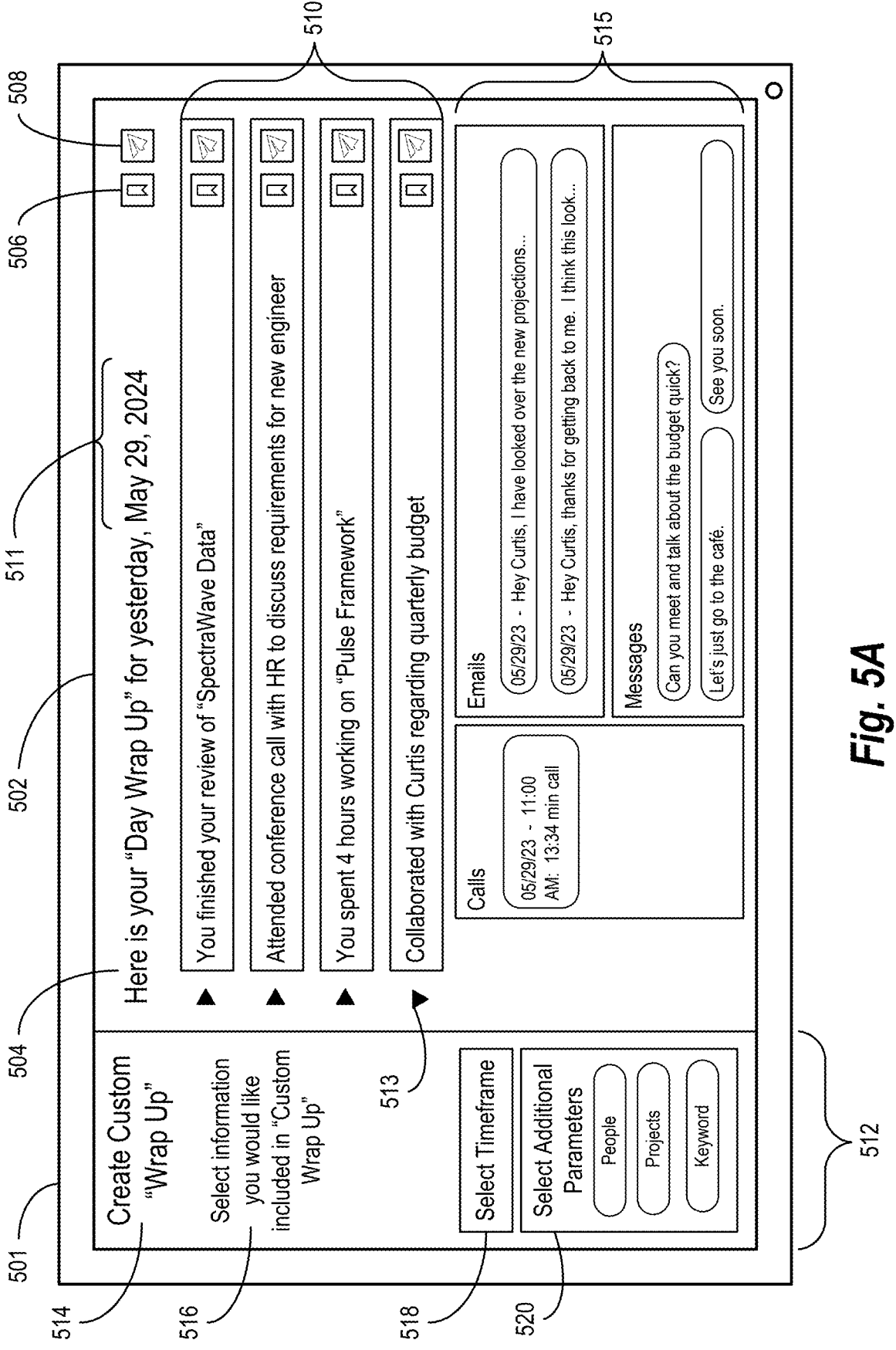
FIG. 5A illustrates an example interface for identifying a subset of synthesized activity items according to a predetermined timeframe.
Figure 5B:
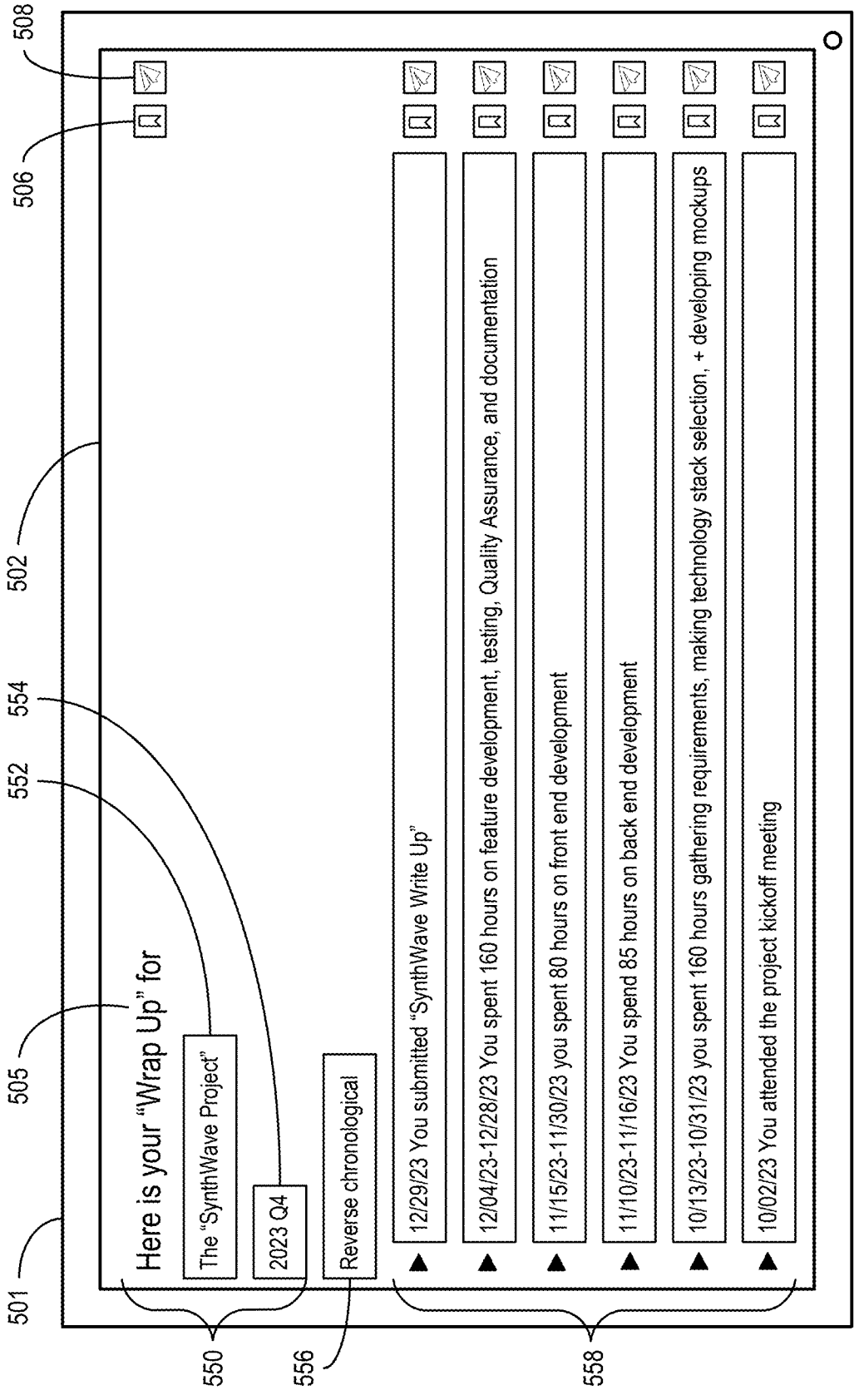
FIG. 5B illustrates an example interface for identifying a customized subset of synthesized activity items according to a predetermined timeframe and one or more additional vectors.

As just mentioned, the activity synthesizing system 102 can generate an activity synopsis for display in a user interface on a client device associated with the user account. FIGS. 5A-5B illustrate an example user interface and various operations performable from the user interface.

As illustrated in FIG. 5A, the activity synthesizing system 102 can generate a user interface 502 for display on a client device 501. The activity synthesizing system 102 can display the activity synopsis 504 with an observation pane of the user interface 502. The activity synthesizing system 102 can include the subset of synthesized activity items 510 in the activity synopsis 504 displayed within the user pane. As indicated by the activity synopsis 504, the activity synthesizing system 102 can provide the subset of synthesized activity items 510 for a specified timeframe 511.

As illustrated, the activity synthesizing system 102 can generate the subset of synthesized activity items 510 such that each synthesized activity item of the subset of synthesized activity items includes a textual summary of a group of activity data items. Additionally, the activity synthesizing system 102 can include a drop-down option 513 for each of the subset of synthesized activity items. Upon receiving an indication of a user interaction with a drop-down option, the activity synthesizing system 102 can expand the textual description of the synthesized activity item to display individual components 515 of the synthesized activity item, such as a summary of phone calls, emails, or messages.

Further within the observation pane of the user interface 502, the activity synthesizing system 102 can provide user interface elements to perform various functions. For example, the activity synthesizing system 102 provides a save element 506 that is selectable to save the activity synopsis 504. Additionally, the activity synthesizing system 102 provides the save element 506 that is selectable to save one or more of the subset of synthesized activity items. In response to a selection of the save element 506, the activity synthesizing system 102 saves the activity synopsis 504 or the one or more of the subset of synthesized activity items.

As shown, the activity synthesizing system 102 can also provide a share element 508 within the observation pane of the user interface 502 that is selectable to send or share the activity synopsis 504. In addition, the activity synthesizing system 102 can also provide the share element 508 for one or more of the synthesized activity items. For example, in response to a selection of the share element 508, the activity synthesizing system 102 can send or provide the activity synopsis 504 or one or more of the synthesized activity items to one or more other client devices associated with additional user accounts. In some cases, the activity synthesizing system 102 identifies and flags the activity synopsis 504 or one or more of the subset of synthesized activity items to be shared with a second user account.

As further shown in FIG. 5A, the activity synthesizing system 102 provides an option 512 for the user account to create a customized activity synopsis. The activity synthesizing system 102 can include a textual indication 514 to create the customized activity synopsis. Additionally, the activity synthesizing system 102 can include a textual indication 516 to select the information for the activity synthesizing system 102 to include in the customized activity synopsis. Indeed, the activity synthesizing system 102 can include an option to select the specified timeframe 518 for the customized activity synopsis. Additionally, the activity synthesizing system 102 can include an option 520 to select additional parameters (e.g., additional predetermined vectors) for the activity synthesizing system 102 to use when generating the customized activity synopsis. More information regarding utilizing the activity synthesizing system 102 to create a customized activity synopsis will be provided below with regard to FIG. 5B.

As illustrated in FIG. 5B, the activity synthesizing system 102 can generate a customized activity synopsis 505. The activity synthesizing system 102 can display the customized activity synopsis 505 in a user interface 502 of a client device 501. The activity synthesizing system 102 can include textual indications of the content and/or parameters 550 (e.g., predetermined vectors) of the customized activity synopsis 504. For example, the activity synthesizing system 102 can generate the customized activity synopsis 505 according to a specified timeframe 554 and/or an operational initiative vector 552. For example, the activity synthesizing system 102 can include an indication of an operational initiative (e.g., a project, such as the "SynthWave" project) summarized by the customized activity synopsis 505, as well as an indication of the specified timeframe (e.g., 2023 Q4) summarized by the customized activity synopsis 505. As discussed above, the activity synthesizing system 102 can provide a save element 506 to save the customized activity synopsis 505, and a share element 508 to share the customized activity synopsis 505.

As illustrated, the activity synthesizing system 102 can include a subset of synthesized activity items 558 in the customized activity synopsis 505 displayed on the user interface 502. The activity synthesizing system 102 can select the subset of synthesized activity items 558 according to the parameters 550. Additionally, the activity synthesizing system 102 can include a selectable drop-down option with each of the subset of synthesized activity items. Moreover, the activity synthesizing system 102 can include a save element 506 and a share element 508 for each of the subset of synthesized activity items in the user interface 502. Moreover, the activity synthesizing system 102 can include a selectable option 556 to organize how the subset of synthesized activity items is displayed in the user interface 502.

FIGS. 1-5B, the corresponding text, and the examples provide a number of different systems and methods for aggregating activity data items, transforming activity data items into synthesized activity items, generating an activity meta summary from the synthesized activity items, and identifying a subset of the synthesized activity items. In addition to the foregoing, implementations can also be described in terms of flowcharts comprising acts steps in a method for accomplishing a particular result. For example, FIG. 6 illustrates an example series of acts for aggregating activity data items, transforming the activity data items into synthesized activity data items, generating an activity meta summary from the synthesized activity items, and identifying a subset of the synthesized activity items according to the activity meta summary in accordance with one or more embodiments.

Figure 6:
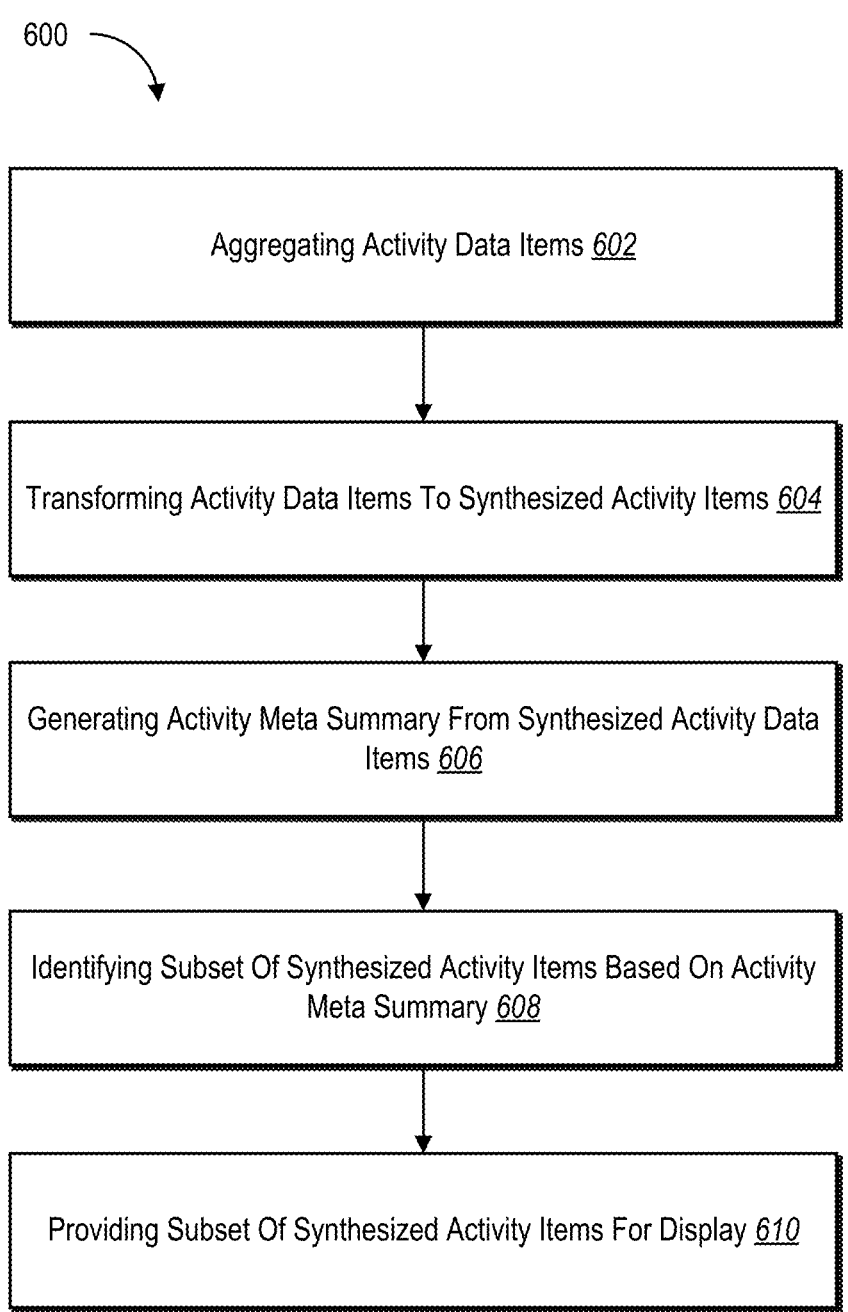
FIG. 6 illustrates an example flowchart of a series of acts for aggregating activity data items, transforming activity data items to synthesized activity items, generating an activity meta summary from the synthesized activity items, and identifying a subset of the synthesized activity items based on the activity meta summary.

While FIG. 6 illustrates acts according to certain implementations, alternative implementations may omit, add to, reorder, and/or modify any of the acts shown in FIG. 6. The acts of FIG. 6 can be performed as part of a computer-implemented method. Alternatively, a non-transitory computer readable medium can comprise instructions that, when executed by one or more processors, cause a computing device to perform the acts of FIG. 6. In still further implementations, a system can perform the acts of FIG. 6.

As illustrated in FIG. 6, the series of acts 600 may include an act 602 of aggregating activity data items. In particular, the act 602 involves aggregating, for a user account, activity data items from one or more data sources, each activity data item comprising contextual content indicating a user interaction within one or more computing environments. In addition, the series of acts 600 includes an act 604 of transforming the activity data items to synthesized activity items. In particular, the act 604 involves transforming, using a large language model, the activity data items to synthesized activity items. As shown, the series of acts 600 includes an act 606 of generating an activity meta summary from the synthesized activity data items. In particular, the act 606 includes generating an activity meta summary for a specified timeframe by processing the synthesized activity items with the large language model. Further, the series of acts 600 includes an act 608 of identifying a subset of synthesized activity items based on the activity meta summery. In particular, the act 608 involves identifying, based on the activity meta summary, a subset of synthesized activity items for the specified timeframe. In addition, the series of acts 600 includes an act 610 of providing the subset of synthesized activity items for display. In particular, the act 610 includes providing, for display on a client device associated with the user account, the subset of synthesized activity items for the specified timeframe.

In some embodiments, the series of acts 600 can include an act of transforming the activity data items to the synthesized activity items by generating a synthesizer prompt including a prompt instruction to transform the activity data items to the synthesized activity data items. Further, the series of acts 600 can include providing the synthesizer prompt and the activity data items to the large language model.

In some embodiments, the series of acts 600 can include an act of generating the activity meta summary for the specified timeframe by processing the synthesized activity items with the large language model by generating a meta prompt comprising a prompt instruction to generate the activity meta summary using the synthesized activity items. Further, the series of acts 600 can include providing the meta prompt and the synthesized activity items to the large language model.

In one or more embodiments, the series of acts 600 can include determining an impact metric to the user account for each of the synthesized activity items. Further, the series of acts 600 can include identifying the subset of synthesized activity items according to the impact metric. The series of acts 600 can include identifying a second user account, determining, within the activity data items, collaboration events between the user account and the second user account for the specified timeframe. Further, the series of acts 600 can include identifying the subset of synthesized activity items according to the collaboration events between the user account and the second user account for the specified timeframe.

Further, the series of acts 600 can include identifying an operational initiative. In addition, the series of acts 600 can include determining within the activity data items, operational initiative events for the specified timeframe. In some embodiments, the series of acts 600 can include identifying the subset of synthesized activity items according to the operational initiative events for the specified timeframe.

In one or more embodiments, the series of acts 600 can include providing, to the client device associated with the user account, a notification of an activity synopsis. Further, the series of acts 600 can include, based on receiving an indication of a user interaction with the notification, providing the activity synopsis comprising the subset of synthesized activity items for the specified timeframe. Further, the series of acts 600 can include determining the specified timeframe from the synthesized activity items based on one of: time stamps for the activity data items; a subset of the activity data items; or input from the user account.

In one or more embodiments, the series of acts 600 can include for aggregating for a user account, activity data items from one or more data sources, each activity data item comprising contextual content indicating a user interaction within one or more computing environments. Further, the series of acts 600 can include transforming, using a large language model, the activity data items to synthesized activity items. Moreover, the series of acts 600 can include generating an activity meta summary according to a contextual vector by processing the synthesized activity items with the large language model. In addition, the series of acts 600 can include identifying, based on the activity meta summary, a subset of synthesized activity items according to the contextual vector. Further, the series of acts 600 can include providing, for display on a client device associated with the user account, the subset of synthesized activity items according to the contextual vector.

In one or more embodiments, the series of acts 600 can include causing the system to transform the activity data items to the synthesized activity items by generating a synthesizer prompt including a prompt instruction to transform the activity data items to the synthesized activity items.

Moreover, the series of acts 600 can include providing the synthesizer prompt and the activity data items to the large language model.

In some embodiments, the series of acts 600 can include causing the system to transform the activity data items to the synthesized activity items by generating a synthesizer prompt comprising a prompt instruction to transform the activity data items to the synthesized activity items. Moreover, the series of acts 600 can include providing the synthesizer prompt and the activity data items to the large language model.

In one or more embodiments the series of acts 600 can include generating a meta prompt comprising a prompt instruction to generate the activity meta summary using the synthesized activity items. Moreover, the series of acts 600 can include providing the meta prompt and the synthesized activity items to the large language model. In some embodiments, the series of acts 600 can include selecting the contextual vector from one or more of: a specified timeframe; collaboration events; or operational initiative events.

Moreover, in some embodiments, the series of acts 600 can include determining an impact metric to the user account for each of the synthesized activity items for the specified timeframe. In addition, the series of acts 600 can include identifying the subset of synthesized activity items according to the impact metric.

In addition, the series of acts 600 can include identifying a second user account. Moreover, the series of acts 600 can include determining, within the activity data items, the collaboration events between the user account and the second user account for the specified timeframe. Indeed, the series of acts 600 can include identifying the subset of synthesized activity items according to the collaboration events between the user account and the second user account for the specified timeframe.

In some embodiments, the series of acts 600 can include determining, within the activity data items, the operational initiative events for the specified timeframe. Moreover, the series of acts 600 can include identifying the subset of synthesized activity items according to the operational initiative events for the specified timeframe.

In one or more embodiments, the series of acts 600 can include aggregating, for a user account, activity data items from one or more data sources, each activity data item comprising contextual content indicating a user interaction within one or more computing environments. Moreover, the series of acts 600 can include transforming, using a large language model, the activity data items to synthesized activity items. In addition, the series of acts 600 can include generating an activity meta summary for a specified timeframe by processing the synthesized activity items with the large language model. Additionally, the series of acts 600 can include generating, based on the activity meta summary, an activity synopsis for the specified timeframe. Moreover, the series of acts 600 can include providing for display on a client device associated with the user account, the activity synopsis for the specified timeframe.

In addition, in some embodiments, the series of acts 600 can include transforming the activity data items to synthesized activity items by generating a synthesizer prompt comprising a prompt instruction to transform the activity data items to the synthesized activity items. Indeed, the series of acts 600 can include providing the synthesizer prompt and the activity data items to the large language model.

In one or more embodiments, the series of acts 600 can include generating the activity meta summary by generating a meta prompt comprising a prompt instruction to generate the activity meta summary using the synthesized activity items. Moreover, the series of acts 600 can include providing the meta prompt and the synthesized activity items to the large language model.

In addition, the series of acts 600 can include identifying a second user account. Moreover, the series of acts 600 can include determining, within the activity data items, collaboration events between the user account and the second user account for the specified timeframe. In some embodiments, the series of acts 600 can include identifying a subset of synthesized activity items from the activity meta summary according to the collaboration events between the user account and the second user account for the specified timeframe.

In one or more embodiments, the series of acts 600 can include identifying an operational initiative. In addition, the series of acts 600 can include determining, within the activity data items, operational initiative events for the specified timeframe. Moreover, the series of acts 600 can include identifying a subset of synthesized activity items according to the operational initiative events for the specified timeframe.

The components of the activity synthesizing system 102 can include software, hardware, or both. For example, the components of the activity synthesizing system 102 can include one or more instructions stored on a computer-readable storage medium and executable by processors of the one or more computing devices. When executed by one or more processors, the computer-executable instructions of the activity synthesizing system 102 can cause a computing device to perform the methods described herein. Alternatively, the components of the activity synthesizing system 102 can comprise hardware, such as a special purpose processing device to perform a certain function or group of functions. Additionally or alternatively, the components of the activity synthesizing system 102 can include a combination of computer-executable instructions and hardware.

Furthermore, the components of the activity synthesizing system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the activity synthesizing system 102 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
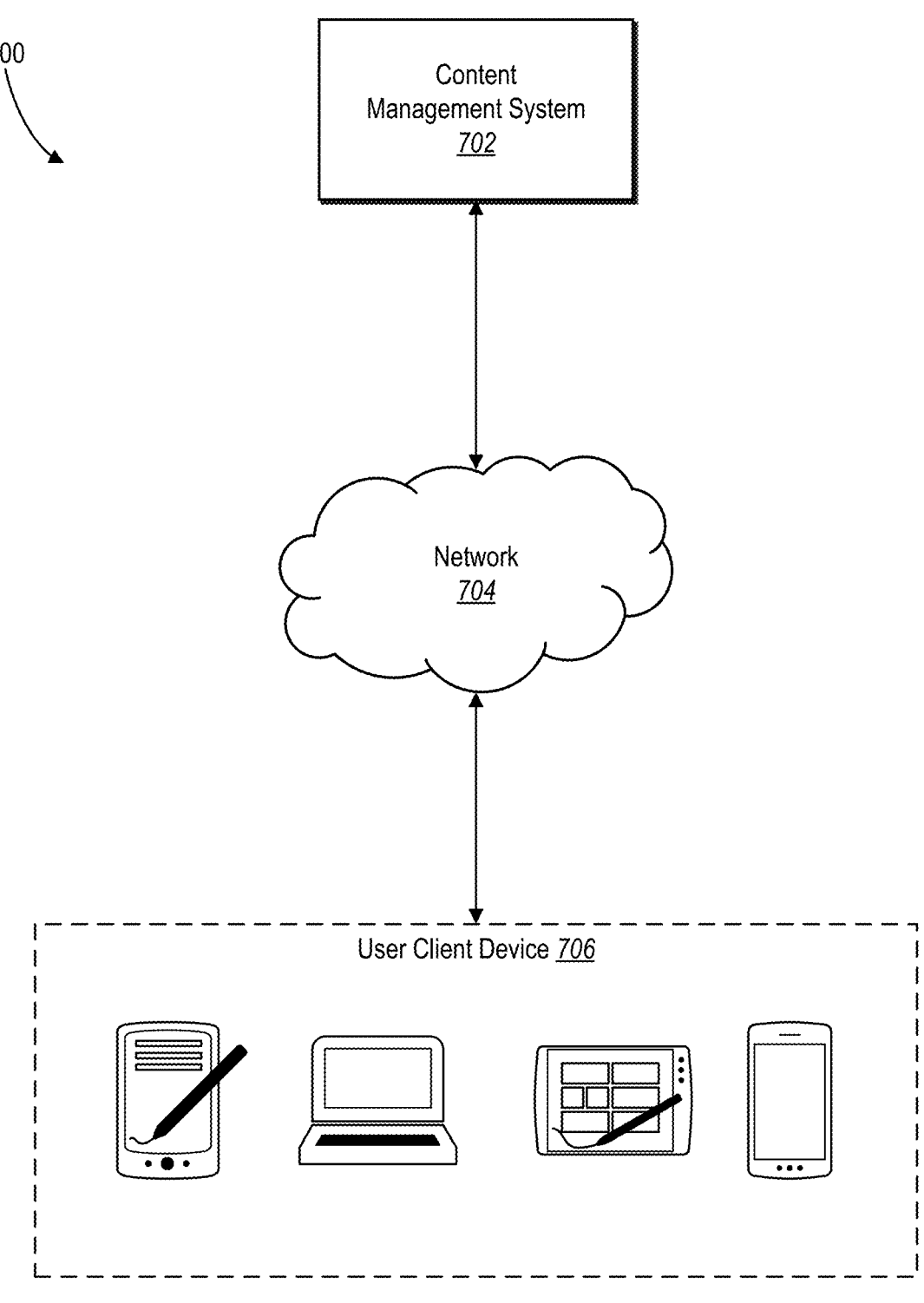
FIG. 7 illustrates an example environment of a networking system having the activity synthesizing system in accordance with one or more embodiments.

FIG. 7 is a schematic diagram illustrating environment 700 within which one or more implementations of the activity synthesizing system 102 can be implemented. For example, the activity synthesizing system 102 may be part of a content management system 702 (e.g., the content management system 106). Content management system 702 may generate, store, manage, receive, and send digital content (such as digital content items). For example, content management system 702 may send and receive digital content to and from client devices 706 by way of network 704. In particular, content management system 702 can store and manage a collection of digital content. Content management system 702 can manage the sharing of digital content between computing devices associated with a plurality of users. For instance, content management system 702 can facilitate a user sharing a digital content with another user of content management system 702.

In particular, content management system 702 can manage synchronizing digital content across multiple client devices 706 associated with one or more users. For example, a user may edit digital content using client device 706. The content management system 702 can cause client device 706 to send the edited digital content to content management system 702. Content management system 702 then synchronizes the edited digital content on one or more additional computing devices.

In addition to synchronizing digital content across multiple devices, one or more implementations of content management system 702 can provide an efficient storage option for users that have large collections of digital content. For example, content management system 702 can store a collection of digital content on content management system 702, while the client device 706 only stores reduced-sized versions of the digital content. A user can navigate and browse the reduced-sized versions (e.g., a thumbnail of a digital image) of the digital content on client device 706. In particular, one way in which a user can experience digital content is to browse the reduced-sized versions of the digital content on client device 706.

Another way in which a user can experience digital content is to select a reduced-size version of digital content to request the full- or high-resolution version of digital content from content management system 702. In particular, upon a user selecting a reduced-sized version of digital content, client device 706 sends a request to content management system 702 requesting the digital content associated with the reduced-sized version of the digital content. Content management system 702 can respond to the request by sending the digital content to client device 706. Client device 706, upon receiving the digital content, can then present the digital content to the user. In this way, a user can have access to large collections of digital content while minimizing the amount of resources used on client device 706.

Client device 706 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 706 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 704.

Network 704 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 706 may access content management system 702.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 8:
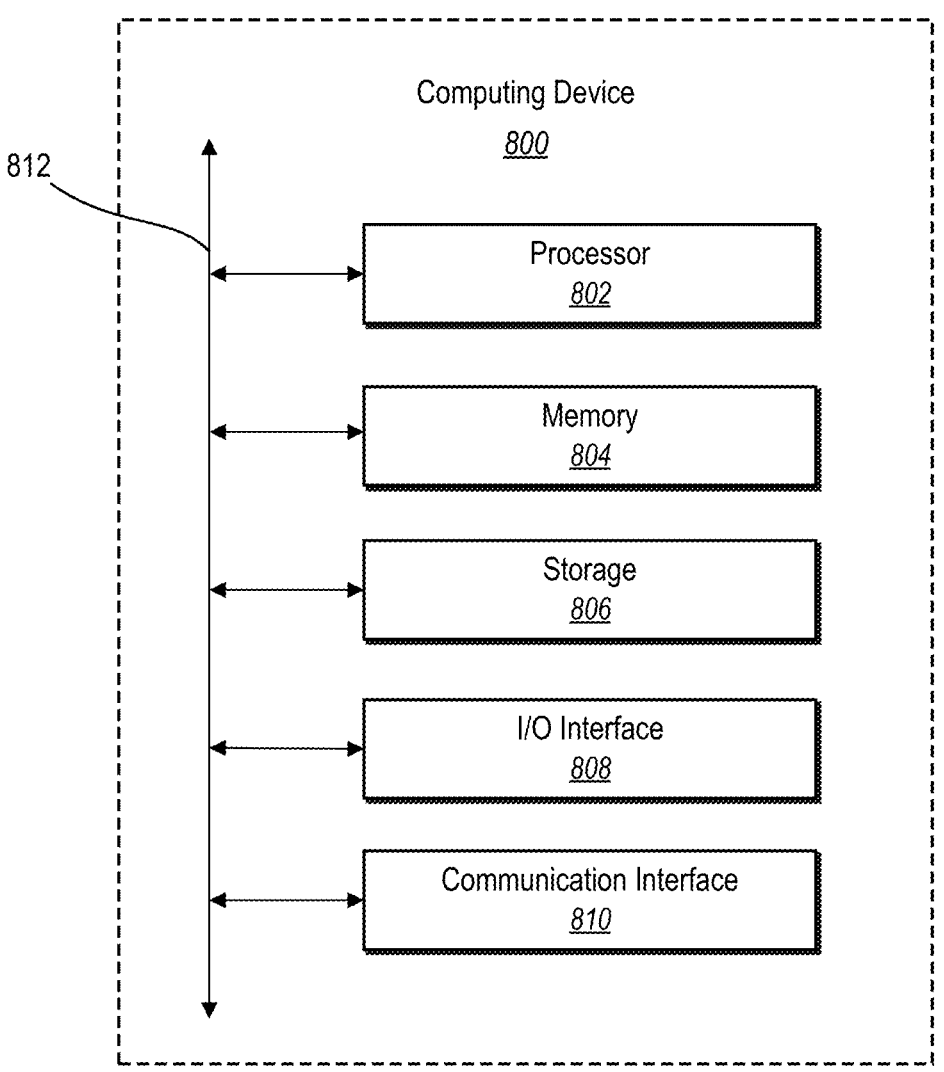
FIG. 8 illustrates a block diagram of an exemplary computing device in accordance with one or more embodiments.

FIG. 8 illustrates a block diagram of exemplary computing device 800 (e.g., the server(s) 104 and/or the client device 108) that may be configured to perform one or more of the processes described above. One will appreciate that server(s) 104 and/or the client device 108 may comprise one or more computing devices such as computing device 800. As shown by FIG. 8, computing device 800 can comprise processor 802, memory 804, storage device 806, I/O interface 808, and communication interface 810, which may be communicatively coupled by way of communication infrastructure 812. While an exemplary computing device 800 is shown in FIG. 8, the components illustrated in FIG. 8 are not intended to be limiting. Additional or alternative components may be used in other implementations. Furthermore, in certain implementations, computing device 800 can include fewer components than those shown in FIG. 8. Components of computing device 800 shown in FIG. 8 will now be described in additional detail.

In particular implementations, processor 802 includes hardware for executing instructions, such as those making up a computer program. As an example, and not by way of limitation, to execute instructions, processor 802 may retrieve (or fetch) the instructions from an internal register, an internal cache, memory 804, or storage device 806 and decode and execute them. In particular implementations, processor 802 may include one or more internal caches for data, instructions, or addresses. As an example, and not by way of limitation, processor 802 may include one or more instruction caches, one or more data caches, and one or more translation lookaside buffers (TLBs). Instructions in the instruction caches may be copies of instructions in memory 804 or storage device 806.

Memory 804 may be used for storing data, metadata, and programs for execution by the processor(s). Memory 804 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 804 may be internal or distributed memory.

Storage device 806 includes storage for storing data or instructions. As an example, and not by way of limitation, storage device 806 can comprise a non-transitory storage medium described above. Storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to computing device 800. In particular implementations, storage device 806 is non-volatile, solid-state memory. In other implementations, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 808 allows a user to provide input to, receive output from, and otherwise transfer data to and receive data from computing device 800. I/O interface 808 may include a mouse, a keypad or a keyboard, a touch screen, a camera, an optical scanner, network interface, modem, other known I/O devices or a combination of such I/O interfaces. I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 808 is configured to provide graphical data to a display for presentation to a user. The graphical data may be representative of one or more graphical user interfaces and/or any other graphical content as may serve a particular implementation.

Communication interface 810 can include hardware, software, or both. In any event, communication interface 810 can provide one or more interfaces for communication (such as, for example, packet-based communication) between computing device 800 and one or more other computing devices or networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 812 may include hardware, software, or both that couples components of computing device 800 to each other. As an example and not by way of limitation, communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

What is claimed is:

1. A computer-implemented method comprising:
   aggregating, for a user account, activity data items having different data formats from one or more data sources, each activity data item comprising contextual content indicating a user interaction within one or more computing environments;
   transforming, using a large language model, the activity data items to synthesized activity items by converting the different data formats of the activity data items to the synthesized activity items having a unified textual format;
   generating an activity meta summary that describes relationships between the synthesized activity items for a specified timeframe by providing the synthesized activity items to the large language model;
   identifying, based on the activity meta summary, a subset of synthesized activity items for the specified timeframe; and
   providing, for display on a client device associated with the user account, the subset of synthesized activity items for the specified timeframe.

2. The computer-implemented method of claim 1, wherein transforming the activity data items to the synthesized activity items comprises:
   generating a synthesizer prompt comprising a prompt instruction to transform the activity data items to the synthesized activity items; and
   providing the synthesizer prompt and the activity data items to the large language model.

3. The computer-implemented method of claim 1, wherein generating the activity meta summary for the specified timeframe by processing the synthesized activity items with the large language model comprises:
   generating a meta prompt comprising a prompt instruction to generate the activity meta summary using the synthesized activity items; and
   providing the meta prompt and the synthesized activity items to the large language model.

4. The computer-implemented method of claim 1, further comprising:
   determining an impact metric to the user account for each of the synthesized activity items; and
   identifying the subset of synthesized activity items according to the impact metric.

5. The computer-implemented method of claim 1, further comprising:

identifying a second user account;

determining, within the activity data items, collaboration events between the user account and the second user account for the specified timeframe; and identifying the subset of synthesized activity items according to the collaboration events between the user account and the second user account for the specified timeframe.

6. The computer-implemented method of claim 1, further comprising:

identifying an operational initiative;

determining, within the activity data items, operational initiative events for the specified timeframe; and identifying the subset of synthesized activity items according to the operational initiative events for the specified timeframe.

7. The computer-implemented method of claim 1, further comprising:

providing, to the client device associated with the user account, a notification of an activity synopsis; and based on receiving an indication of a user interaction with the notification, providing the activity synopsis comprising the subset of synthesized activity items for the specified timeframe.

8. The computer-implemented method of claim 1, further comprising determining the specified timeframe from the synthesized activity items based on one of:

time stamps of the activity data items;

a subset of the activity data items; or input from the user account.

9. A system comprising:

at least one processor; and a non-transitory computer-readable medium storing instructions which, when executed by the at least one processor, cause the system to:

aggregate, for a user account, activity data items having different data formats from one or more data sources, each activity data item comprising contextual content indicating a user interaction within one or more computing environments;

transform, using a large language model, the activity data items to synthesized activity items by converting the different data formats of the activity data items to the synthesized activity items having a unified textual format;

generate an activity meta summary that describes relationships between the synthesized activity items according to a contextual vector by providing the synthesized activity items to the large language model;

identify, based on the activity meta summary, a subset of synthesized activity items according to the contextual vector; and provide, for display on a client device associated with the user account, the subset of synthesized activity items according to the contextual vector.

10. The system of claim 9, further storing instructions which, when executed by the at least one processor, cause the system to transform the activity data items to the synthesized activity items by:

generating a synthesizer prompt comprising a prompt instruction to transform the activity data items to the synthesized activity items; and providing the synthesizer prompt and the activity data items to the large language model.

11. The system of claim 9, further storing instructions which, when executed by the at least one processor, cause the system to generate the activity meta summary by:

generating a meta prompt comprising a prompt instruction to generate the activity meta summary using the synthesized activity items; and providing the meta prompt and the synthesized activity items to the large language model.

12. The system of claim 9, further storing instructions which, when executed by the at least one processor, cause the system to select the contextual vector from one or more of: a specified timeframe; collaboration events; or operational initiative events.

13. The system of claim 12, further storing instructions which, when executed by the at least one processor, cause the system to:

determine an impact metric to the user account for each of the synthesized activity items for the specified timeframe; and identify the subset of synthesized activity items according to the impact metric.

14. The system of claim 12, further storing instructions which, when executed by the at least one processor, cause the system to:

identify a second user account;

determine, within the activity data items, the collaboration events between the user account and the second user account for the specified timeframe; and identify the subset of synthesized activity items according to the collaboration events between the user account and the second user account for the specified timeframe.

15. The system of claim 12, further storing instructions which, when executed by the at least one processor, cause the system to:

determine, within the activity data items, the operational initiative events for the specified timeframe; and identify the subset of synthesized activity items according to the operational initiative events for the specified timeframe.

16. A non-transitory computer-readable medium storing executable instructions which, when executed by at least one processor, cause the at least one processor to:

aggregate, for a user account, activity data items having different data formats from one or more data sources, each activity data item comprising contextual content indicating a user interaction within one or more computing environments;

transform, using a large language model, the activity data items to synthesized activity items by converting the different data formats of the activity data items to the synthesized activity items having a unified textual format;

generate an activity meta summary that describes relationships between the synthesized activity items for a specified timeframe by providing the synthesized activity items to the large language model;

generate, based on the activity meta summary, an activity synopsis for the specified timeframe; and provide, for display on a client device associated with the user account, the activity synopsis for the specified timeframe.

17. The non-transitory computer-readable medium of claim 16, further storing instructions which, when executed by the at least one processor, cause the at least one processor to transform the activity data items to synthesized activity items by:

generating a synthesizer prompt comprising a prompt instruction to transform the activity data items to the synthesized activity items; and providing the synthesizer prompt and the activity data items to the large language model.

18. The non-transitory computer-readable medium of claim 16, further storing instructions which, when executed by the at least one processor, cause the at least one processor to generate the activity meta summary by:

generating a meta prompt comprising a prompt instruction to generate the activity meta summary using the synthesized activity items; and providing the meta prompt and the synthesized activity items to the large language model.

19. The non-transitory computer-readable medium of claim 16, further storing instructions which, when executed by the at least one processor, cause the at least one processor to:

identify a second user account;

determine, within the activity data items, collaboration events between the user account and the second user account for the specified timeframe; and identify a subset of synthesized activity items from the activity meta summary according to the collaboration events between the user account and the second user account for the specified timeframe.

20. The non-transitory computer-readable medium of claim 16, further storing instructions which, when executed by the at least one processor, cause the at least one processor to:

identify an operational initiative;

determine, within the activity data items, operational initiative events for the specified timeframe; and identify a subset of synthesized activity items according to the operational initiative events for the specified timeframe.

* * * * *